United States Patent
Teraoka et al.

(10) Patent No.: US 11,928,900 B2
(45) Date of Patent: Mar. 12, 2024

(54) ARITHMETIC OPERATION DEVICE AND DETERMINATION METHOD

(71) Applicant: Hitachi Astemo, Ltd., Hitachinaka (JP)

(72) Inventors: Hidetoshi Teraoka, Tokyo (JP); Masashi Yano, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 233 days.

(21) Appl. No.: 17/433,080

(22) PCT Filed: Feb. 21, 2020

(86) PCT No.: PCT/JP2020/007013
§ 371 (c)(1),
(2) Date: Aug. 23, 2021

(87) PCT Pub. No.: WO2020/202886
PCT Pub. Date: Oct. 8, 2020

(65) Prior Publication Data
US 2022/0148344 A1 May 12, 2022

(30) Foreign Application Priority Data
Mar. 29, 2019 (JP) .................................. 2019-066887

(51) Int. Cl.
*G06F 8/65* (2018.01)
*B60W 50/00* (2006.01)
(Continued)

(52) U.S. Cl.
CPC ............ *G07C 5/008* (2013.01); *B60W 50/00* (2013.01); *G06F 8/65* (2013.01);
(Continued)

(58) Field of Classification Search
None
See application file for complete search history.

(56) References Cited

U.S. PATENT DOCUMENTS 11,093,273 B2 * 8/2021 Shin ..................... G06F 9/45558
11,520,891 B1 * 12/2022 Karolitsky ............ H04L 9/3247
(Continued)

FOREIGN PATENT DOCUMENTS

JP 2004-276828 A 10/2004
JP 2009-199497 A 9/2009
(Continued)

OTHER PUBLICATIONS

K. Mansour, W. Farag and M. ElHelw, "AiroDiag: A sophisticated tool that diagnoses and updates vehicles software over air," 2012 IEEE International Electric Vehicle Conference, Greenville, SC, USA, 2012, pp. 1-7, doi: 10.1109/IEVC.2012.6183181. (Year: 2012).*
(Continued)

*Primary Examiner* — Jason D Mitchell
(74) *Attorney, Agent, or Firm* — Foley & Lardner LLP

(57) ABSTRACT

There is provided an arithmetic operation device which is connected to a plurality of electronic control units. One or more electronic control units of the plurality of electronic control units constitute each of functions. The arithmetic operation device includes an external communication unit which receives, for each function, function configuration information including first verification information and first identification information of the one or more electronic control units constituting the function, an acquisition unit which acquires version information of software installed on the electronic control unit and second identification information of the electronic control unit from each of the plurality of electronic control units, a calculation unit which calculates, for each function, second verification information by using the version information acquired by the acquisition unit which is the version information of all the electronic control units constituting the function and the
(Continued)

second identification information of all the electronic control units constituting the function, and a determination unit that determines, for each function, whether or not the first verification information and the second verification information match.

9 Claims, 23 Drawing Sheets

(51) Int. Cl.
  *G07C 5/00* (2006.01)
  *G06F 8/71* (2018.01)
  *G08C 17/02* (2006.01)

(52) U.S. Cl.
  CPC . *B60W 2050/0083* (2013.01); *B60W 2556/45* (2020.02); *G06F 8/71* (2013.01); *G08C 17/02* (2013.01)

(56) References Cited

U.S. PATENT DOCUMENTS

| | | | |
|---|---|---|---|
| 2017/0192770 A1* | 7/2017 | Ujiie | G06F 11/1433 |
| 2018/0018160 A1 | 1/2018 | Teraoka et al. | |
| 2018/0081671 A1 | 3/2018 | Naruse et al. | |
| 2019/0057214 A1* | 2/2019 | Xia | H04W 12/06 |
| 2019/0095192 A1* | 3/2019 | Akita | G06F 3/1204 |
| 2019/0235857 A1* | 8/2019 | Ishiguro | G06F 11/00 |
| 2019/0278587 A1* | 9/2019 | Miyake | G06F 8/61 |
| 2021/0216361 A1* | 7/2021 | Ishigooka | G06F 8/65 |

FOREIGN PATENT DOCUMENTS

| | | |
|---|---|---|
| JP | 2016-188016 A | 11/2016 |
| JP | 2018-124749 A | 8/2018 |
| WO | WO-2015/011840 A1 | 1/2015 |
| WO | WO-2016/147766 A1 | 9/2016 |

OTHER PUBLICATIONS

International Search Report with English translation and Written Opinion issued in corresponding application No. PCT/JP2020/007013 dated Apr. 21, 2020.

* cited by examiner

| FUNCTION IDENTIFICATION ID | FUNCTION IDENTIFICATION VERIFICATION INFORMATION | COMBINATION TABLE | | | TABLE VERIFICATION INFORMATION | FLAG | |
|---|---|---|---|---|---|---|---|
| | | 6031 NET ID | 6032 ECU ID | 6033 SOFTWARE VERSION | | | |
| A1 | aaa | 700 | ENGINE | 1.0.0.0 | taaa | OPERATION PERMISSION | R11 |
| B1 | bbb | 701 | BRAKE | 1.0.0.0 | tbbb | STOP | R21 |
| C1 | ccc | 700 | ENGINE | 1.0.0.0 | tccc | STOP | R31 |
| | | 701 | BRAKE | 1.0.0.0 | | | |
| | | 702 | ADAS | 1.0.0.1 | | | |

(b) 61b

| FUNCTION IDENTIFICATION ID | FUNCTION IDENTIFICATION VERIFICATION INFORMATION | COMBINATION TABLE | | | TABLE VERIFICATION INFORMATION | FLAG | |
|---|---|---|---|---|---|---|---|
| | | 6031 NET ID | 6032 ECU ID | 6033 SOFTWARE VERSION | | | |
| A2 | azzz | 700 | ENGINE | 1.0.0.1 | taab | OPERATION PERMISSION | R12 |
| B1 | bbb | 701 | BRAKE | 1.0.0.0 | tbbb | STOP | R22 |
| C2 | czzz | 700 | ENGINE | 1.0.0.1 | tccd | STOP | R32 |
| | | 701 | BRAKE | 1.0.0.0 | | | |
| | | 702 | ADAS | 1.0.0.1 | | | |

FIG. 16

| FUNCTION IDENTIFICATION ID (601) | FUNCTION IDENTIFICATION VERIFICATION INFORMATION (602) | COMBINATION TABLE (603) 6031 NET ID | TABLE VERIFICATION INFORMATION (604) | FLAG (605) |
|---|---|---|---|---|
| A1 | aaa | 700 | taaa | OPERATION PERMISSION |
| B1 | bbb | 701 | tbbb | STOP |
| C1 | ccc | 700 | tccc | STOP |
| | | 701 | | |
| | | 702 | | |

FIG. 17

| FUNCTION IDENTIFICATION ID (601) | FUNCTION IDENTIFICATION VERIFICATION INFORMATION (602) | COMBINATION TABLE 6032 (603) ECU ID | TABLE VERIFICATION INFORMATION (604) | FLAG (605) |
|---|---|---|---|---|
| A1 | aaa | ENGINE | taaa | OPERATION PERMISSION |
| B1 | bbb | BRAKE | tbbb | STOP |
| C1 | ccc | ENGINE<br>BRAKE<br>ADAS | tccc | STOP |

| SOFTWARE VERSION | 1.0.0.0 |
|---|---|
| FUNCTION A VERSION | 1 |
| FUNCTION C VERSION | 1 |

951a (a)

| SOFTWARE VERSION | 1.0.1.0 |
|---|---|
| FUNCTION A VERSION | 2 |
| FUNCTION C VERSION | 1 |

| FUNCTION IDENTIFICATION ID | FUNCTION IDENTIFICATION VERIFICATION INFORMATION | COMBINATION TABLE 6034 | | | 6035 | TABLE VERIFICATION INFORMATION | FLAG | |
|---|---|---|---|---|---|---|---|---|
| | | NET ID | ECU ID | DID | FUNCTION VERSION | | | |
| A1 | aaa | 700 | ENGINE | F001 | 1 | taaa | OPERATION PERMISSION | R41 |
| B1 | bbb | 701 | BRAKE | F002 | 1 | tbbb | STOP | R51 |
| C1 | ccc | 700 | ENGINE | F003 | 1 | tccc | STOP | R61 |
| | | 701 | BRAKE | F003 | 1 | | | |
| | | 702 | ADAS | F003 | 1 | | | |

 62a (b)

| FUNCTION IDENTIFICATION ID | FUNCTION IDENTIFICATION VERIFICATION INFORMATION | COMBINATION TABLE 6034 | | | 6035 | TABLE VERIFICATION INFORMATION | FLAG | |
|---|---|---|---|---|---|---|---|---|
| | | NET ID | ECU ID | DID | FUNCTION VERSION | | | |
| A2 | azzz | 700 | ENGINE | F001 | 2 | taaB | OPERATION PERMISSION | R42 |
| B1 | bbb | 701 | BRAKE | F002 | 1 | tbbb | STOP | R52 |
| C1 | ccc | 700 | ENGINE | F003 | 1 | tccC | STOP | R62 |
| | | 701 | BRAKE | F003 | 1 | | | |
| | | 702 | ADAS | F003 | 1 | | | |

 62b

FIG. 20

| BOOT LOADER | BSW | ASW | CALIBRATION | FUNCTION A | FUNCTION C |
|---|---|---|---|---|---|
| 1. | 1. | 1. | 1. | 1. | 1. |

952a (a)

| BOOT LOADER | BSW | ASW | CALIBRATION | FUNCTION A | FUNCTION C |
|---|---|---|---|---|---|
| 1. | 1. | 2. | 1. | 2. | 1. |

| FUNCTION IDENTIFICATION ID | FUNCTION IDENTIFICATION VERIFICATION INFORMATION | COMBINATION TABLE | | | | TABLE VERIFICATION INFORMATION | FLAG | |
|---|---|---|---|---|---|---|---|---|
| | | NET ID | ECU ID | MASK 6036 | FUNCTION VERSION 6035 | | | |
| A1 | aaa | 700 | ENGINE | 4 | 1 | taaa | OPERATION PERMISSION | R71 |
| B1 | bbb | 701 | BRAKE | 4 | 1 | tbbb | STOP | R81 |
| C1 | ccc | 700 | ENGINE | 5 | 1 | tccc | STOP | R91 |
| | | 701 | BRAKE | 5 | 1 | | | |
| | | 702 | ADAS | 4 | 1 | | | |

63b

| FUNCTION IDENTIFICATION ID | FUNCTION IDENTIFICATION VERIFICATION INFORMATION | COMBINATION TABLE | | | | TABLE VERIFICATION INFORMATION | FLAG | |
|---|---|---|---|---|---|---|---|---|
| | | NET ID | ECU ID | MASK 6036 | FUNCTION VERSION 6035 | | | |
| A2 | aaa | 700 | ENGINE | 4 | 2 | taab | OPERATION PERMISSION | R72 |
| B1 | bbb | 701 | BRAKE | 4 | 1 | tbbb | STOP | R82 |
| C1 | ccc | 700 | ENGINE | 5 | 1 | tccc | STOP | R92 |
| | | 701 | BRAKE | 5 | 1 | | | |
| | | 702 | ADAS | 4 | 1 | | | |

| FUNCTION IDENTIFICATION ID | FUNCTION IDENTIFICATION VERIFICATION INFORMATION | COMBINATION TABLE ||| TABLE VERIFICATION INFORMATION | FLAG |
| --- | --- | --- | --- | --- | --- | --- |
| | | 6031 | 6032 | 6033 | | |
| | | NET ID | ECU ID | SOFTWARE VERSION | | |
| D2 | dzzz | 701 | BRAKE | 1.0.0.0 | tddd | RESTRICTION |
| | | 702 | ADAS | 1.0.0.1 | | |
| | | 703 | CAMERA | 1.0.0.0 | | |

| FUNCTION | VERSION MISMATCH ECU ID | RESTRICTION CONTENT |
| --- | --- | --- |
| D | BRAKE | ONLY WARNING OPERATED |
| | ADAS | ALL FUNCTIONS STOPPED |
| | CAMERA | ALL FUNCTIONS STOPPED |

91
R41

ARITHMETIC OPERATION DEVICE AND DETERMINATION METHOD

TECHNICAL FIELD

The present invention relates to an arithmetic operation device and a determination method.

BACKGROUND ART

In recent years, as driving assistance functions and self-driving technologies have been developed, a scale of software installed on an electric control unit (ECU) for a vehicle has been increased. Accordingly, not only the number of times of recall caused by a software failure but also the number of vehicles for which it is necessary to be handled per one time is increased. Thus, there is an increasing need for a technology for remotely updating the software installed on the ECU. It is easy to update the software, and thus, there is a problem that configurations of hardware and software for each function constituting the vehicle are managed. PTL 1 discloses a vehicle specification system that specifies a vehicle including a plurality of electronic control units. The vehicle specification system includes pattern storage means for storing, as a pattern, identification data of each electronic control unit mounted on each vehicle and connection data indicating a connection status between the electronic control units, and collation means for collating a pattern of any vehicle with a pattern stored in the pattern storage means. Any vehicle is specified by identity between the pattern of any vehicle and the stored pattern.

CITATION LIST

Patent Literature

PTL 1: JP 2004-276828 A

SUMMARY OF INVENTION

Technical Problem

In the invention described in PTL 1, configuration information for each function cannot be confirmed.

Solution to Problem

An arithmetic operation device according to a first aspect of the present invention is an arithmetic operation device which is connected to a plurality of electronic control units. One or more electronic control units of the plurality of electronic control units constitute each of functions. The arithmetic operation device includes an external communication unit which receives, for each function, function configuration information including first verification information and first identification information of the one or more electronic control units constituting the function, an acquisition unit which acquires version information of software installed on the electronic control unit and second identification information of the electronic control unit from each of the plurality of electronic control units, a calculation unit which calculates, for each function, second verification information by using the version information acquired by the acquisition unit which is the version information of all the electronic control units constituting the function and the second identification information of all the electronic control units constituting the function, and a determination unit that determines, for each function, whether or not the first verification information and the second verification information match.

A determination method according to a second aspect of the present invention is a determination method executed by an arithmetic operation device connected to a plurality of electronic control units. One or more electronic control units of the plurality of electronic control units constitute each function. The determination method includes receiving, for each function, first verification information and first identification information of the one or more electronic control units constituting the function, acquiring version information of software installed on the electronic control unit and second identification information of the electronic control unit from each of the plurality of electronic control units, creating, for each function, second verification information by using the acquired version information which is the version information of all the electronic control units constituting the function and the second identification information of all the electronic control units constituting the function, and determining, for each function, whether or not the first verification information and the second verification information match.

Advantageous Effects of Invention

According to the invention, the configuration information for each function can be confirmed.

BRIEF DESCRIPTION OF DRAWINGS

FIG. 6 is a diagram illustrating an example of function configuration information 61.

FIG. 16 is a diagram illustrating an example of function configuration information 64 according to Modification Example 2.

FIG. 17 is a diagram illustrating an example of function configuration information 65 according to Modification Example 3.

FIG. 18 is a diagram illustrating an example of function-specific version information 951 according to a second embodiment.

FIG. 19 is a diagram illustrating an example of function configuration information 62 according to the second embodiment.

FIG. 20 is a diagram illustrating an example of function-specific version information 952 according to a third embodiment.

FIG. 21 is a diagram illustrating an example of function configuration information 63 according to the third embodiment.

FIG. 22 is a diagram illustrating function configuration information 61c of a function D according to a fourth embodiment.

FIG. 23 is a diagram illustrating an example of function restriction information 91 according to the fourth embodiment.

DESCRIPTION OF EMBODIMENTS

First Embodiment

Hereinafter, a function configuration information management system according to a first embodiment of a gateway which is an arithmetic operation device according to the invention will be described with reference to FIGS. 1 to 13.

(System Configuration)

Figure 1:
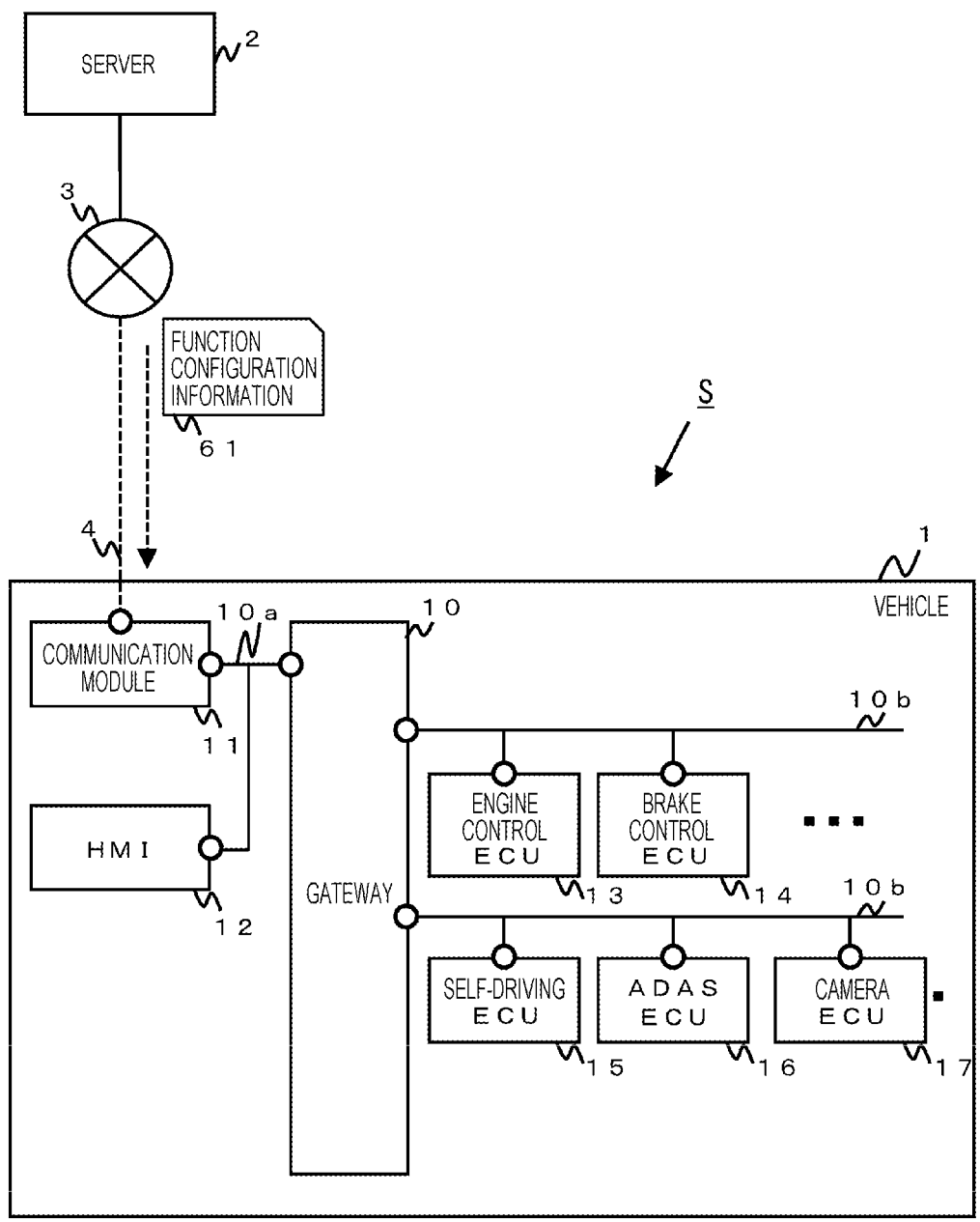
FIG. 1 is a diagram illustrating a configuration of a function configuration information management system S according to a first embodiment.

FIG. 1 is a diagram illustrating a configuration of a function configuration information management system S according to the first embodiment. The function configuration information management system S includes a vehicle 1 and a server 2. The vehicle 1 and the server 2 are connected via the Internet 3 that connects an access network and a base and an access network 4 provided by a communication service provider.

The vehicle 1 includes a gateway 10, a communication module 11, a human machine interface (HMI) 12, and a plurality of electronic control units (ECUs). The gateway 10, the communication module 11, and the HMI 12 are connected by an in-vehicle network 10a.

The ECUs included in the vehicle 1 are not particularly limited, but the present embodiment includes, for example, an engine control ECU 13, a brake control ECU 14, a self-driving ECU 15, and an advanced driving assistance system (ADAS) ECU 16. The gateway 10 and these ECUs are connected by an in-vehicle network 10b. Hereinafter, these ECUs, as well as camera ECU 17, connected to the gateway 10 are collectively referred to as "subordinate ECUs".

The in-vehicle network 10a and the in-vehicle network 10b adopt any one of known communication standards, for example, a Control Area Network (CAN) (registered trademark), a Local Interconnect Network (LIN), FlexRay, and Ethernet (registered trademark). In the present embodiment, the in-vehicle network 10b is CAN, and the in-vehicle network 10a is Ethernet. However, the in-vehicle network 10a and the in-vehicle network 10b may adopt the same communication standard. Although not illustrated in FIG. 1, the components in the vehicle such as various ECUs are connected to a storage battery via a power line to receive power supply.

The gateway 10 relays communication data between the subordinate ECUs, updates software of the subordinate ECU, and confirms matching of software installed on the subordinate ECU. However, hereinafter, the matching confirmation of the software is also referred to as "verification" or "verification processing". In the present embodiment, the gateway 10 does not perform the software update and the matching confirmation of the gateway 10 itself, but the gateway 10 may perform the software update and the matching confirmation of the gateway 10 itself. In the present embodiment, the "verification" and "matching" are used in the same meaning.

The communication module 11 relays communication between the gateway 10, the HMI 12, the subordinate ECUs, and the server 2. The HMI 12 is a device for presenting information to a user who is an occupant of the vehicle 1 and receiving an input from the user. The HMI 12 includes a display device that displays a screen, an input device such as various switches, a touch panel obtained by combining these devices, or the like. The engine control ECU 13 controls an engine. The brake control ECU 14 controls a brake. The self-driving ECU 15 performs recognition of an environment, a start instruction of the vehicle, and the like during self-driving. The ADAS ECU 16 performs driving assistance control such as automatic brake.

The server 2 transmits function configuration information 61 to the gateway 10. The gateway 10 manages a function configuration of the vehicle 1 based on the function configuration information 61.

(Hardware Configuration of Gateway)

Figure 2:
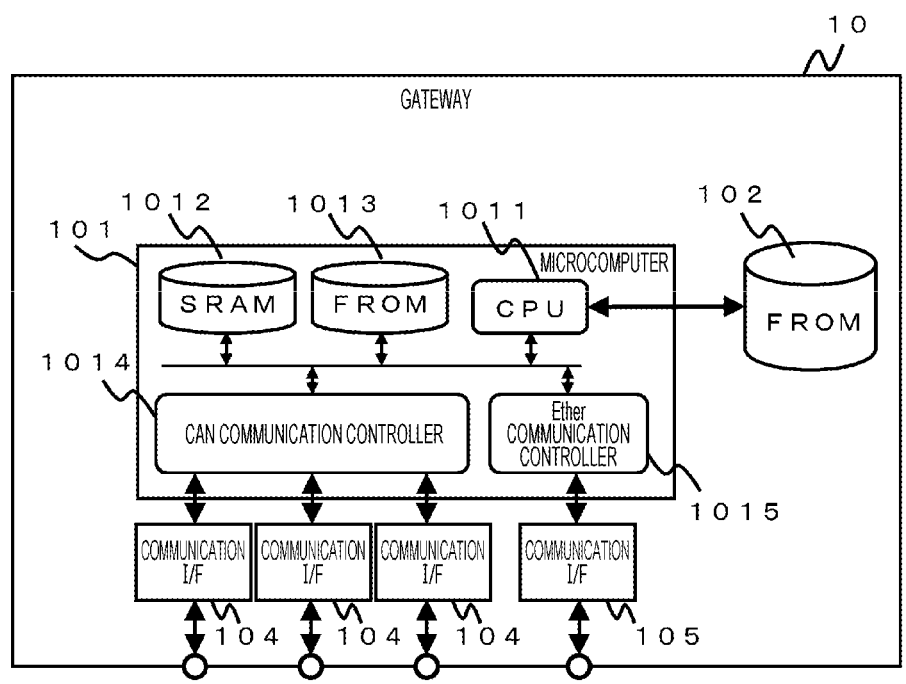
FIG. 2 is a block diagram illustrating a hardware configuration of a gateway 10.

FIG. 2 is a block diagram illustrating a hardware configuration of the gateway 10. The gateway 10 includes a microcomputer 101, a flash ROM (FROM) 102, a communication interface (I/F) 104 for CAN, and a communication I/F 105 for Ethernet.

The microcomputer 101 includes a CPU 1011, an SRAM 1012, a FROM 1013, a CAN communication controller 1014, and an Ether communication controller 1015. The CPU 1011 of the microcomputer 101 functions as the gateway 10 by executing a program stored in the FROM 1013, controlling other components in the gateway 10, and issuing a data transmission and reception instruction with other devices connected by the in-vehicle network. For example, an application specific integrated circuit (ASIC) or a field-programmable gate array (FPGA) may be used instead of the CPU 1011.

The FROM 102 is a nonvolatile memory and stores information received from the server 2. The CAN communication controller 1014 is an interface for CAN communication, and transmits and receives data to and from the subordinate ECUs connected to the in-vehicle network 10b via the in-vehicle network 10b based on an instruction from the microcomputer 101. The Ether communication controller 1015 is an interface for Ethernet communication, and transmits and receives data to and from the devices connected to the in-vehicle network 10a via the in-vehicle network 10a based on an instruction from the microcomputer 101.

(Configuration of ECU)

Figure 3:
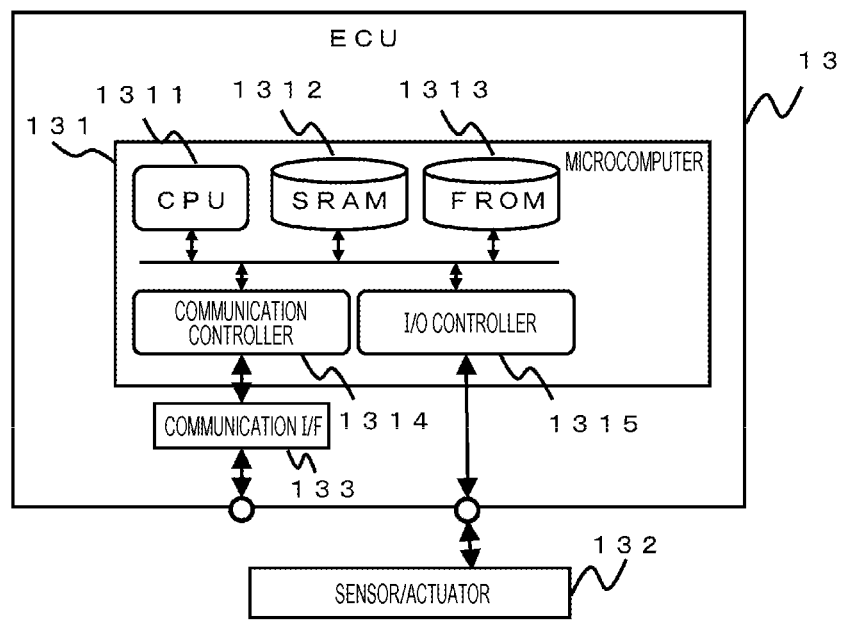
FIG. 3 is a block diagram illustrating a hardware configuration example of an engine control ECU 13.

FIG. 3 is a block diagram illustrating a hardware configuration example of the engine control ECU 13. However, in the present embodiment, all the ECUs of which the software is to be updated have at least the hardware configuration illustrated in FIG. 3. The engine control ECU 13 includes a microcomputer 131 and a communication I/F 133 for CAN.

The microcomputer 131 includes a CPU 1311, an SRAM 1312, a FROM 1313, a communication controller 1314, and an I/O controller 1315. The microcomputer 131 performs engine control by executing a control program stored in the FROM 1313, controlling other components in the engine control ECU and a sensor/actuator 132 connected via an I/O, and issuing a data transmission and reception instruction with other devices connected via the in-vehicle network. The sensor/actuator 132 executes the engine control while acquiring data required for the engine control in accordance with an instruction from the microcomputer 131.

The FROM 1313 also stores version information of the control program stored in the FROM 1313. The FROM 1313 also stores an ECU ID which is identification information for specifying a type and a function of the ECU. The ECU ID is also referred to as a "part number" or a "model number". The ECU ID is not a so-called manufacturing number for identifying an individual product, but can be replaced with another product having the same ECU ID when the ECU fails.

Figure 4:
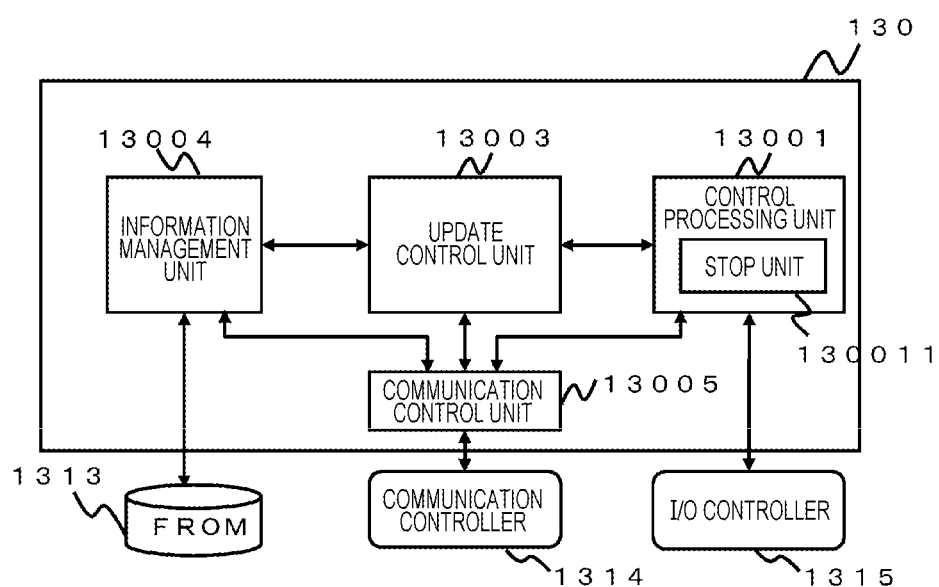
FIG. 4 is a block diagram illustrating a configuration of a control program 130 operating on the engine control ECU 13.

FIG. 4 is a block diagram illustrating a configuration of a control program 130 operating on the engine control ECU 13. However, in the present embodiment, all the ECUs of which the software is to be updated have at least the same configuration as the control program 130 illustrated in FIG. 4.

The control program 130 that realizes the function of the ECU 13 is stored in the FROM 1313 of the microcomputer 131 and is executed by the CPU 1311. In FIG. 4, a functional group is expressed as a block, and each block may be divided into a plurality of blocks or some blocks may be integrated. The control program may be realized by one piece of software or may be realized by a combination of two or more pieces of software.

The control program 130 includes a control processing unit 13001, an update control unit 13003, an information management unit 13004, and a communication control unit 13005. The control processing unit 13001 performs the engine control by controlling the I/O controller 1315 and controlling the sensor/actuator 132. A stop unit 130011 receives a stop command or a restart command from the gateway 10 via the communication control unit 13005, and performs stop and restart control of the function.

The update control unit 13003 receives an operation command from the gateway 10 and data used for the software update via the communication control unit 13005, and controls the software update. The information management unit 13004 reads out version information and an ECU ID of the software stored in the FROM 1313, and rewrites the version information accompanying the software update.

The communication control unit 13005 communicates with the device connected to the in-vehicle network 10b by controlling the communication controller 1314 in accordance with an instruction from the update control unit 13003 or the like. At the time of communication, a CAN frame is analyzed and constructed. The communication control unit 13005 generates and analyzes a command conforming to a diagnostic communication protocol such as UDS.

(Function and Configuration)

In the present embodiment, a function of the vehicle 1 is realized by a certain ECU or by cooperation of a plurality of ECUs. The cooperation means that the ECUs operate in cooperation with each other, but each ECU does not necessarily need to recognize other cooperative ECUs, and as a result, the plurality of ECUs may be involved in realizing the function. For example, when a certain function X is realized by cooperation between the engine control ECU 13 and the self-driving ECU 15, in the present embodiment, the cooperation means that the engine control ECU 13 and the self-driving ECU 15 "constitute" the function X. The cooperation also means that the engine control ECU 13 and the self-driving ECU 15 "realize" the function X.

(Configuration of Server)

Figure 5:
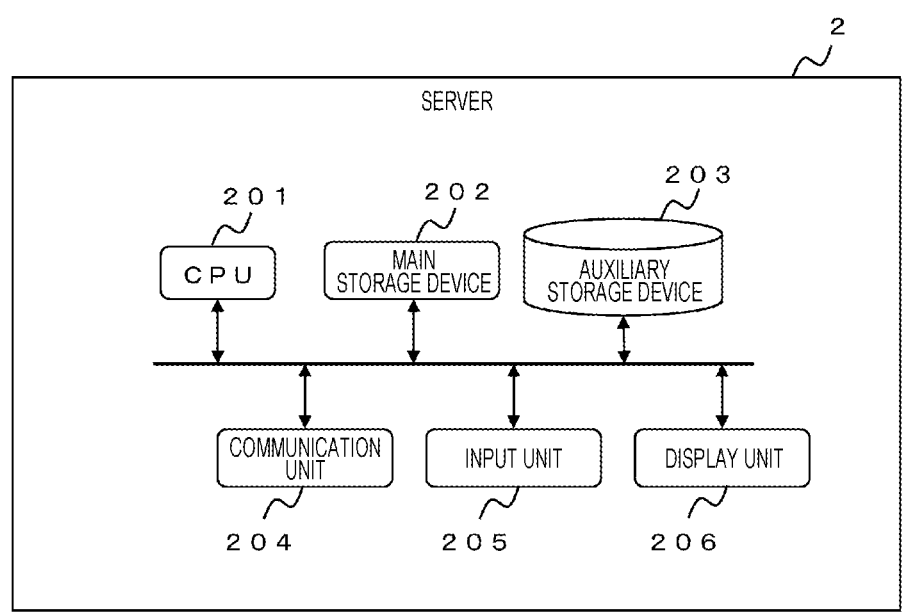
FIG. 5 is a block diagram illustrating a configuration example of a server 2.

FIG. 5 is a block diagram illustrating a configuration example of the server 2. The server 2 includes a CPU 201, a main storage unit 202, an auxiliary storage unit 203, a communication unit 204, an input unit 205, and a display unit 206. The CPU 201 controls registration and delivery of function configuration management information by executing a server program accumulated in the auxiliary storage unit 203 or the like on the main storage unit 202. The auxiliary storage unit 203 stores the function configuration management information and the ECU software update data to be delivered to the vehicle.

The communication unit 204 transmits and receives data to and from the vehicle 1 via the Internet. The input unit 205 receives operation and input information from an operator who operates the server 2. The display unit 206 provides information regarding function configuration management information registration to the operator operating the server 2.

(Function Configuration Management Information)

FIG. 6 is a diagram illustrating an example of the function configuration information 61 generated by the server 2 and managed by a diagnosis device 5 or a table management unit 10001 of the gateway 10. FIG. 6(a) illustrates the function configuration information 61a which is the function configuration information 61 before the change, and FIG. 6(b) illustrates function configuration information 61b which is the function configuration information 61 after the change.

FIG. 6 illustrates an example of a case where the function configuration information 61 is managed as a table and configuration information for each function is recorded. The function configuration information 61 has a plurality of records. Each record of the function configuration information 61 includes fields of a function identification ID 601, function identification verification information 602, a combination table 603, combination table verification information 604, and a flag 605. In the example illustrated in FIG. 6, the function configuration information 61 has three records of R11, R21, and R31, but the record of the function configuration information 61 may be 1 or more, and there is no upper limit. The fields of the function identification verification information 602 and the table verification information 604 store results of arithmetic operations by the CPU 201 of the server 2. Pieces of information on other fields are input by the operator.

The function identification ID 601 is a field in which identification information for identifying a combination of hardware and software of the ECU that constructs the function is stored. Here, the "software" is a concept including a version number. Accordingly, a value of the function identification ID 601 is changed not only when the ECU ID registered in the combination table 603 is changed but also when the version of the software is changed. The function identification ID 601 is, for example, a combination of a character string for identifying a function and a numeral corresponding to the change in the ECU ID or the version.

The function identification verification information 602 is a region in which integrity verification information of the function identification ID 601 is stored. The integrity verification information of the function identification ID 601 is, for example, a digital signature of the function identification ID 601.

The combination table 603 includes a NET ID 6031, an ECU ID 6032, and a software version 6033. The combination table 603 stores information on the combination of the hardware and the software of the ECU related to the function indicated by the function identification ID 601. The NET ID 6031 stores an ID indicating identification information of the ECU on the in-vehicle network. When the in-vehicle network 10b is CAN, a CAN ID is stored in the NET ID 6031, and when the in-vehicle network 10b is Ethernet, an IP address or a MAC address is stored. The NET ID 6031 may include information (not illustrated) such as a network type and a channel number.

The ECU ID 6032 stores information for identifying the type and the function of the ECU. The ECU ID 6032 stores, for example, "engine" which is identification information indicating a type and a function of the engine control ECU 13. As the identification information of the ECU, a part number or the like may be used. That is, the NET ID 6031 is an identifier of the ECU on the network, whereas the ECU ID 6032 is an identifier indicating the type of the ECU. Hereinafter, the NET ID 6031 may be referred to as "first identification information", and the ECU ID 6032 may be referred to as "second identification information".

The software version 6033 is a field in which information for identifying a version of software installed on the ECU is stored. Hereinafter, the information stored in the ECU ID 6032 and the information stored in the software version 6033 are also referred to as "configuration information".

The combination table verification information 604 is a region in which integrity verification information of information registered in the combination table 603 is stored. The combination table verification information 604 is, for example, a digital signature of a value obtained by connecting the function identification ID 601, the ECU ID 6032, and the software version 6033.

When there is a contradiction between the information registered in the combination table 603 and information collected from the subordinate ECU, the flag 605 stores information indicating whether or not to permit continuation of an operation of the function indicated by the function identification ID 601. When the continuous operation is permitted, "operation permission" is stored, and when the operation permission is not allowed and stop is required, "stop" is stored.

A record R11 in FIG. 6(a) is a record in which information related to a function A of which the function identification ID is indicated by "A1" is stored. "aaa" is stored in the field of the function identification verification information 602 of the record R11, "700" is stored in the field of the NET ID 6031, "engine" indicating the engine control ECU 13 is stored in the field of the ECU ID 6032, "1.0.0.0" is stored in the field of the software version 6033, "taaa" is stored in the field of the combination table verification information 604, and "operation permission" indicating that the continuation of the operation of the function is permitted even when the mismatch has occurred is stored in the field of the flag 605.

A record R21 in FIG. 6(a) is a record in which information related to a function B of which the function identification ID is indicated by "B1" is stored. "bbb" is stored in the field of the function identification verification information 602 of the record R21, "701" is stored in the field of the NET ID 6031, "brake" indicating the brake control ECU 14 is stored in the field of the ECU ID 6032, "1.0.0.0" is stored in the field of the software version 6033, "tbbb" is stored in the field of the combination table verification information 604, and "stop" indicating that it is necessary to stop the operation of the function when the mismatch has occurred is stored in the field of the flag 605.

A record R31 in FIG. 6(a) is a record in which information related to a function C of which the function identification ID is indicated by "C1" is stored. "ccc" is stored in the field of the function identification verification information 602 of the record R31. Since there are three ECUs constituting the function C, "700", "701", and "702" are stored in the fields of the NET ID 6031, "engine", "brake", and "ADAS" are stored in the fields of the ECU ID 6032, and "1.0.0.0", "1.0.0.0", and "1.0.0.0" are stored in the fields of the software version 6033. "tccc" is stored in the field of the combination table verification information 604 of the record R31, and "stop" indicating that it is necessary to stop the operation of the function when the mismatch has occurred is stored in the field of the flag 605.

Here, although an example in which the function C is constituted by three ECUs has been described, as described above, one function may be constituted by several ECUs, and there is no upper limit on the number of ECUs constituting one function.

FIG. 6(b) is a diagram illustrating the function configuration information 61b which is the function configuration information 61 after update when the software of the engine control ECU 13 is updated from the function configuration information 61a illustrated in FIG. 6(b). Specifically, in FIG. 6(b), the software version of the engine control ECU 13 is updated from "1.0.0.0" to "1.0.0.1". The records R12, R22, and R32 illustrated in FIG. 6(b) correspond to the records R11, R21, and R31 illustrated in FIG. 6(a), respectively.

With the update of the software, as illustrated in records R12 and R32 of FIG. 6(b), the software version 6033 of the record in which the ECU ID 6032 is "engine" is updated to "1.0.0.1". The function identification IDs 601 of the functions of a record D101b and a record D103b each including the engine control ECU 13 as a component are updated to "A2" and "C2", respectively. As described above, in the function configuration information, it is necessary to update the function identification ID with the configuration change of the ECU related to function realization.

(Software Configuration of Gateway or Diagnosis Device)

Figure 7:
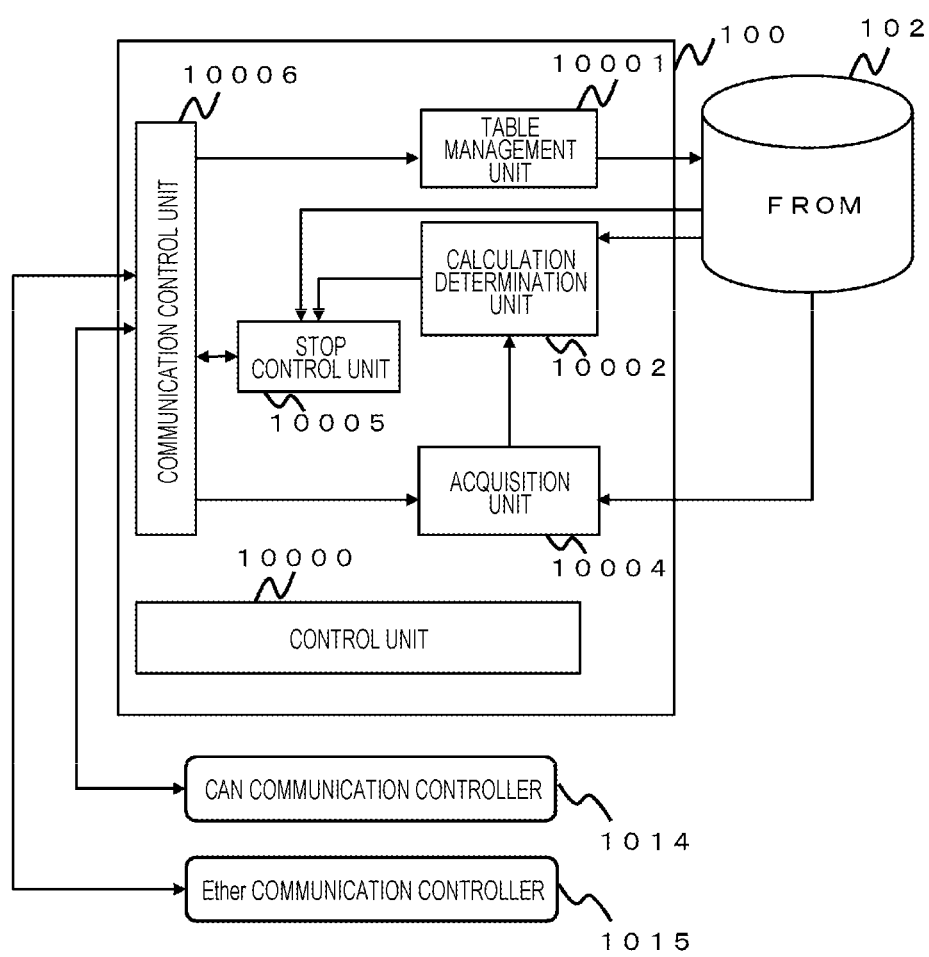
FIG. 7 is a block diagram illustrating a configuration of a gateway program 100 operating on the gateway 10.

FIG. 7 is a block diagram illustrating a configuration of a gateway program 100 operating in the gateway 10.

The gateway program 100 that realizes a function of the gateway 10 is stored in the FROM 1013 of the microcomputer 101 and is executed by the CPU 1011. In FIG. 7, a functional group is expressed as a block, and each block may be divided into a plurality of blocks or some blocks may be integrated. The control program may be realized by one piece of software or may be realized by a combination of two or more pieces of software.

The gateway program 100 includes a control unit 10000, a table management unit 10001, a calculation determination unit 10002, an acquisition unit 10004, a stop control unit 10005, and a communication control unit 10006. The control unit 10000 controls the table management unit 10001, the calculation determination unit 10002, the acquisition unit 10004, the stop control unit 10005, and the communication control unit 10006. The table management unit 10001 manages the function configuration information 61 stored in the FROM 1013.

The calculation determination unit 10002 calculates a verification value by using the configuration information acquired from the acquisition unit 10004 and determines whether or not the verification value matches the table verification information 604 included in the function configuration information 61. The calculation determination unit 10002 outputs the determination result to the stop control unit 10005. A method for calculating the verification value is similar to the method in the server 2. When values used by the calculation determination unit 10002 to calculate the verification value, that is, the ECU ID and the version of the software are the same as the values used by the server 2 to calculate the verification value, the verification value and the table verification information 604 match.

The acquisition unit 10004 acquires the configuration information such as the ECU ID and the software version from the ECU based on the information managed by the table management unit 10001, and outputs the acquired configuration information to a verification information calculation unit. The stop control unit 10005 performs operation continuation and stop control of the function in which the mismatch has occurred based on a flag indicating operation permission or stop managed by the table management unit 10001 and output information of the calculation determination unit 10002.

The communication control unit 10006 communicates with the devices connected to the in-vehicle networks 10a and 10b by controlling the CAN communication controller 1014 and the Ether communication controller 1015 in accordance with an instruction from the stop control unit 10005 or the like. When the communication with the device connected to the in-vehicle network 10a is performed, the communication control unit 10007 analyzes and generates a packet such as TCP/IP or UDP/IP. When the communication with the device connected to the in-vehicle network 10b is performed, the communication control unit 10006 analyzes and generates a CAN frame. Since the communication control unit 10006 can communicate with the outside of the vehicle 1 via the communication module 11, this communication control unit can also be referred to as an "external communication unit".

(Verification)

Figure 8:
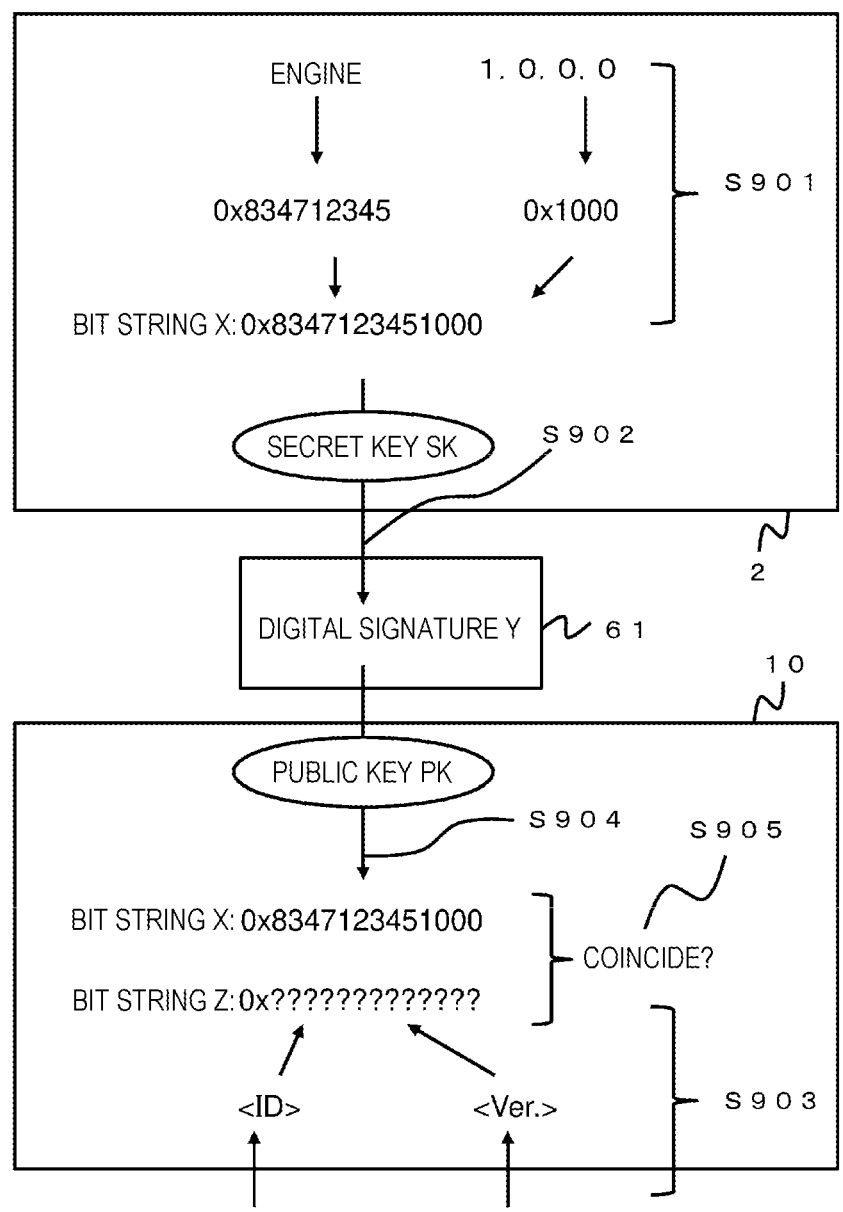
FIG. 8 is a conceptual diagram illustrating verification of table verification information 604 according to the present embodiment.

FIG. 8 is a conceptual diagram illustrating verification of the table verification information 604 according to the present embodiment. In FIG. 8, step numbers are assigned for the sake of convenience in order to show correspondence with the following description. These step numbers do not correspond to step numbers of a flowchart to be described later.

A secret key SK is stored in advance in the server 2, and a public key PK is stored in advance in the gateway 10. The CPU 201 of the server 2 creates a bit string X in which the configuration information is connected for each function according to a predetermined rule (S901). For example, in the case of only the ECU "engine control ECU" constituting the function A as illustrated in FIG. 6, in order to create the table verification information 604 of the function A, the CPU 201 obtains "0x834712345" by converting "engine" into, for example, a character code number of UTF-8 according to a predetermined rule, and obtains "0x1000" by converting the version number "1.0.0.0" according to a predetermined rule. "0x8347123451000" obtained by connecting the two bit strings is set as the bit string X.

When a certain function is constituted by a plurality of ECUs, a rule is decided in advance such that the bit strings are arranged in ascending order of the NET ID as the arrangement order of the bit strings when the bit string X is created.

The CPU 201 creates a digital signature Y for the bit string X by using the secret key SK (S902). The created digital signature Y is stored as the table verification information 604 of the function configuration information 61 and transmitted to the gateway 10. A method for creating the digital signature Y is shared with the gateway 10 in advance.

The gateway 10 reads out the configuration information from the ECU for each function while referring to the function configuration information 61 received from the server 2, and creates a bit string Z which is a verification value according to a predetermined rule (S903). The rule of the bit string Z is the same as the creation rule of the bit string X stored in the server 2. The gateway 10 decrypts the table verification information 604 stored in the function configuration information 61, that is, obtains the bit string X by decrypting the digital signature Y by using the public key PK (S904).

by way of caution, when the combination of the secret key SK and the public key PK prepared in advance is appropriate, the bit string X obtained by being decrypted in the gateway 10 is the same as the bit string X created in the server 2 regardless of the ECU connected to the gateway 10. Finally, the gateway 10 determines whether or not the verification has succeeded by determining whether or not the bit string X and the bit string Z are the same (S905).

However, in creating the digital signature Y using the bit string X, the digital signature Y may be created for a hash value of the bit string X or an XOR value of the bit string X and a predetermined value without using the bit string X as it is. The execution order of steps S903 and S904 in the above description may be changed, or the steps may be executed substantially simultaneously. Hereinafter, the bit string Z is also referred to as a "verification value". Although the target to be compared with the bit string Z is the bit string X as described above, in the following description, in order to avoid redundant description, it is simply described as "determining the matching between the bit string Z and the digital signature Y" or "determining the matching between the verification value and the table verification information 604".

(Vehicle-Side Screen Display Example)

Figure 9:
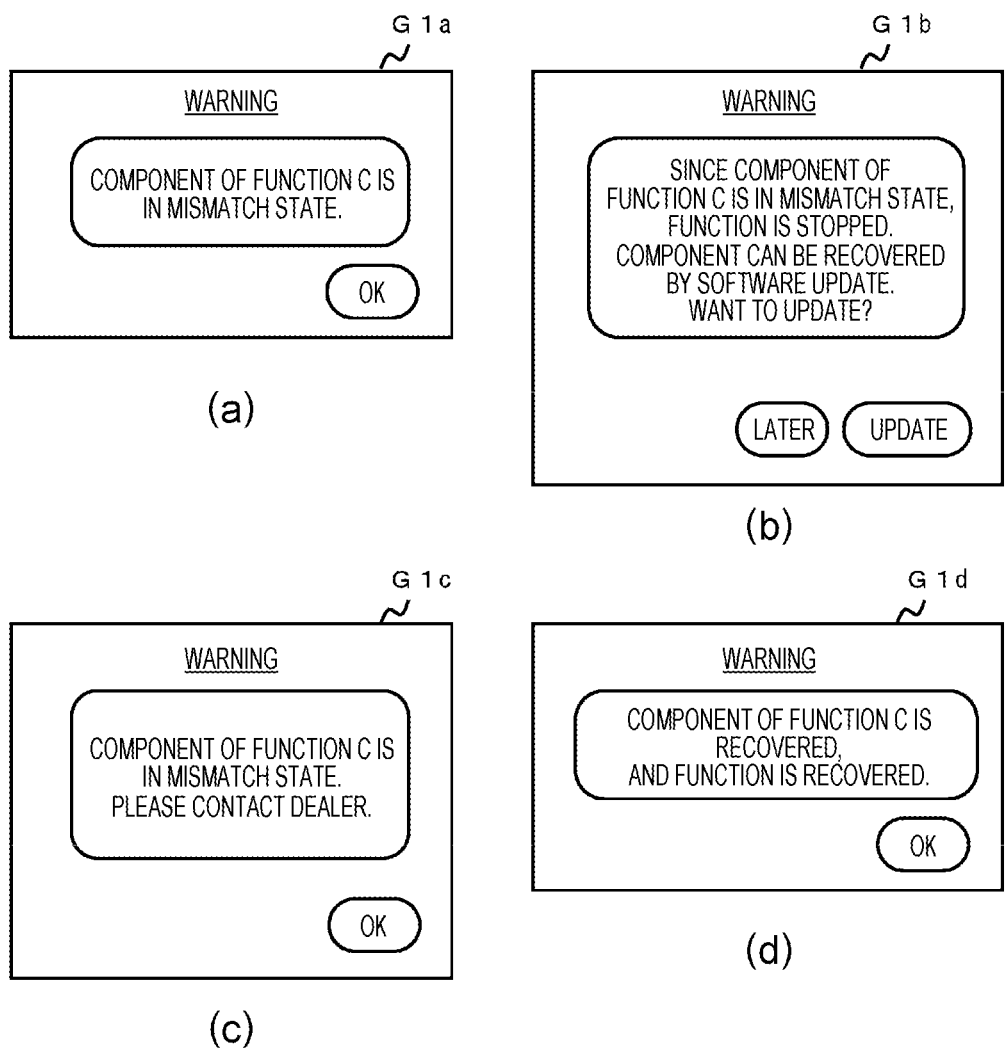
FIG. 9 is a diagram illustrating an example of a display screen displayed on an HMI 12.

FIG. 9 is a diagram illustrating an example of a display screen displayed on the HMI 12. A display G1a illustrated in FIG. 9(a) is a screen example showing that the mismatch between the function configuration information and an actual configuration has been detected to the user. When the function is stopped due to the mismatch, information indicating that the function is stopped may be further displayed on the screen. A display G1b illustrated in FIG. 9(b) is a screen example showing that a part of the function has been stopped due to the mismatch of the function configuration information to the user.

A display G1c illustrated in FIG. 9(c) is a screen example prompting the user to contact a dealer for recovery since countermeasures against the mismatch of the function configuration information cannot be taken. A display G1d illustrated in FIG. 9(d) is a screen example showing that the mismatch of the function configuration information has been recovered and a part of the functions has been recovered to the user.

(Confirmation Sequence)

Figure 10:
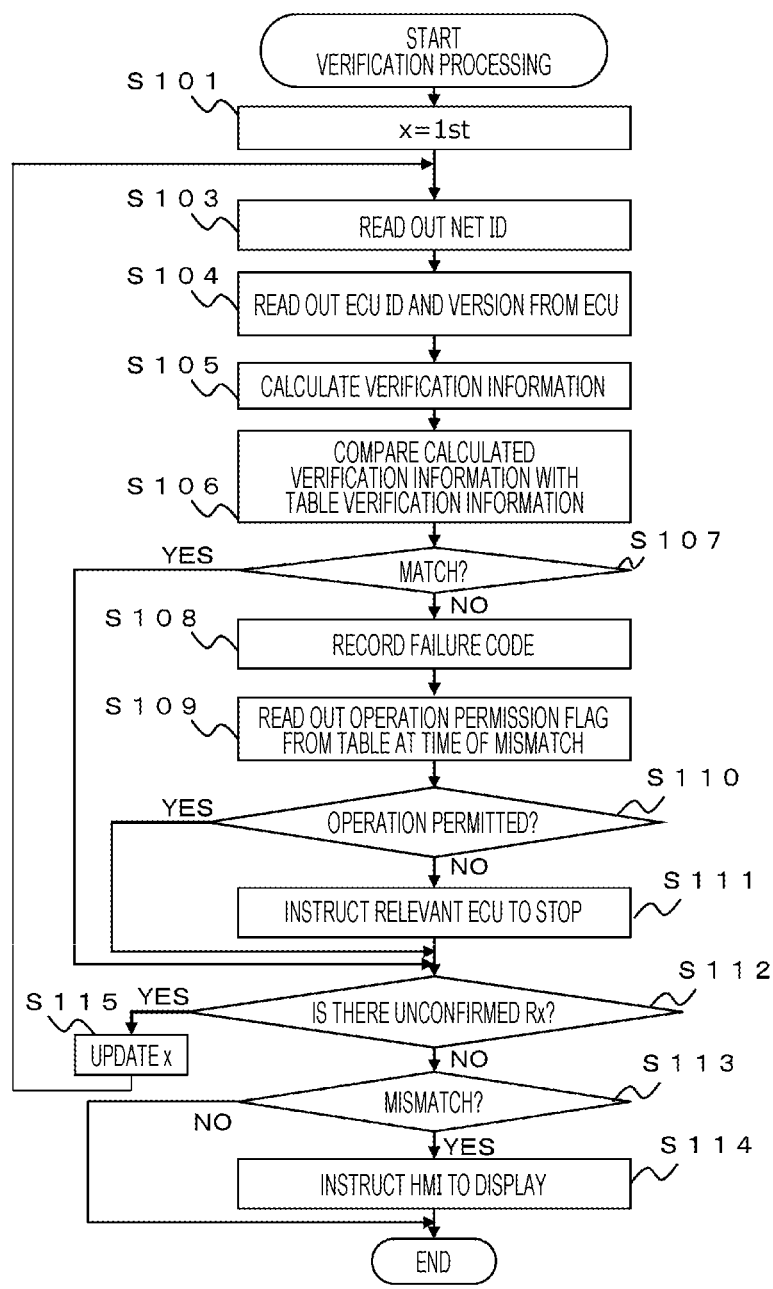
FIG. 10 is a flowchart illustrating verification processing in the gateway 10.

FIG. 10 is a flowchart illustrating verification processing in the gateway 10. The processing illustrated in FIG. 10 is executed when an ignition switch of the vehicle 1 is turned on. The gateway 10 may be connected to the ignition switch by a signal line and may directly receive a signal indicating an on or off state from the ignition switch, or may receive an operation command signal from an ECU (not illustrated) connected to the ignition switch and may start an operation.

First, the control unit 10000 initially sets a processing target record x to be 1 (S101). When the function configuration information 61 is as illustrated in FIG. 6(*a*), the record R11 is read when X=1, and the record R21 is read when X=2. The gateway program 100 repeats tasks of processing of S103 to S111 by the number of records stored in the function configuration information 61 according to the determination of S112 to be described later.

The control unit 10000 reads out the NET ID of the processing target record x in the function configuration information 61, and instructs the acquisition unit 10004 to read out the configuration information from the ECU having the NET ID (S103). The acquisition unit 10004 reads out the configuration information, that is, the combination of the ECU ID and the software version from the ECU via the communication control unit 10006, and delivers the readout configuration information to the calculation determination unit 10002 (S104). When there are the plurality of NET IDs as in the record R31 illustrated in FIG. 6(*a*), the configuration information is read for all the NET IDs. The calculation determination unit 10002 calculates the verification information by using the received configuration information (S105).

The calculation determination unit 10002 reads out the table verification information 604 in the processing target record x of the function configuration information 61 and determines whether or not the table verification information matches the verification value calculated in S105 (S106). When it is determined that the verification value and the table verification information 604 match (S107: YES), the calculation determination unit 10002 proceeds to S112, and the control unit 10000 confirms whether or not there is an unconfirmed record. When it is determined that there is no unconfirmed record (S112: NO), the control unit 10000 confirms whether or not the confirmed record matches. When it is determined that there is no mismatch, that is, the verification value calculated by the calculation determination unit 10002 for all the records of the function configuration information 61 and the table verification information 604 read out from the function configuration information 61 match (S113: NO), the control unit 10000 ends the processing.

When it is determined that there is the mismatch, that is, the verification value calculated by the calculation determination unit 10002 in any record of the function configuration information 61 and the table verification information 604 read out from the function configuration information 61 do not match (S113: YES), the control unit 10000 instructs the HMI to display the screen G1*a* of FIG. 9 (S114), and ends the processing. When there is the unconfirmed record (S112: YES), the control unit 10000 updates the processing target record x to the next record (S115) and returns to S103.

When it is determined that the version information does not match (S107: NO), the control unit 10000 records a failure code indicating that the version information does not match, that is, a diagnostic trouble code (DTC) code (S108). The stop control unit 10005 receives the processing target record X and the comparison result from the control unit 10000, and reads out the flag 605 of the record from the function configuration information 61 (S109). When the readout flag 605 is "operation permission" (YES in S110), the stop control unit 10005 continues the processing without performing the stop instruction. When the readout flag 605 is not the "operation permission" (S110: NO), the stop control unit instructs the relevant ECU registered in the processing target record X of the function configuration information 61 to stop the function via the communication control unit 10006 (S111). The description of FIG. 10 has been performed as described above.

(Recovery Sequence at the Time of Mismatch)

Figure 11:
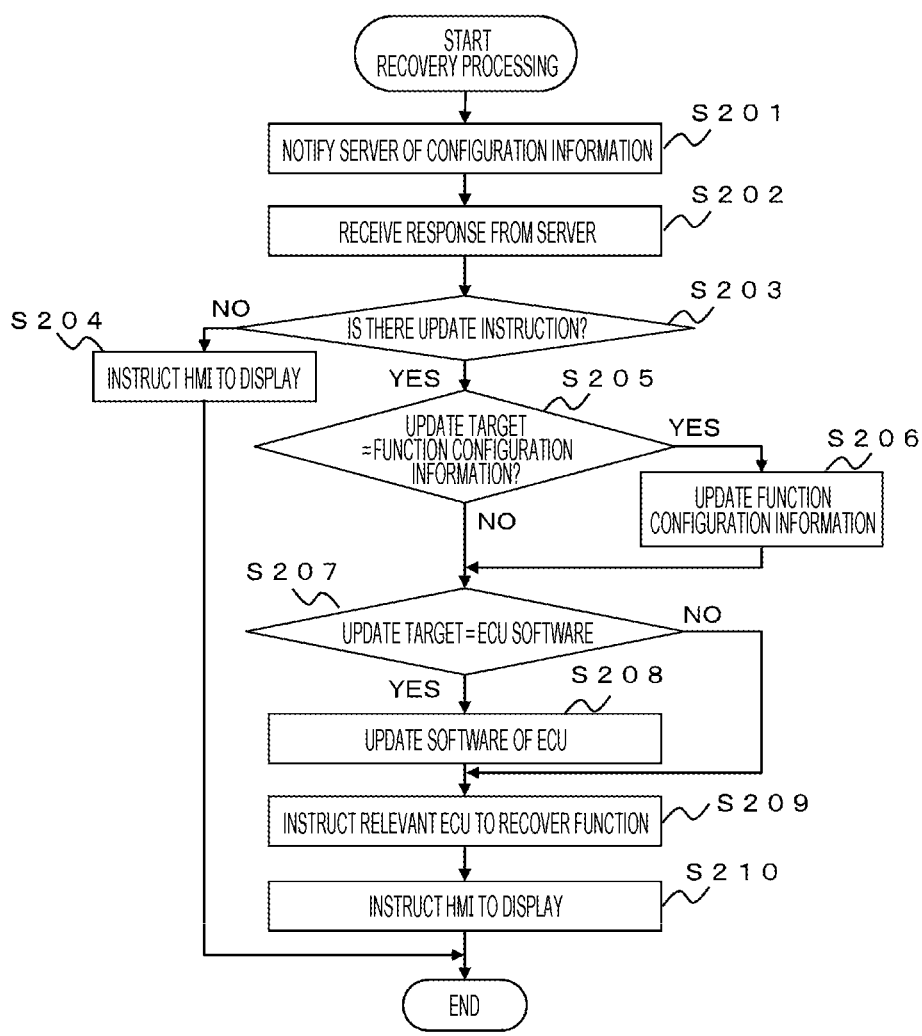
FIG. 11 is a flowchart illustrating recovery processing in the gateway 10.

FIG. 11 is a flowchart illustrating recovery processing in the gateway 10. The processing illustrated in FIG. 11 is executed after the processing illustrated in FIG. 10 is completed and when there is the mismatch in any record of the function configuration information 61. However, the processing illustrated in FIG. 11 may not be necessarily started after waiting for the completion of the processing illustrated in FIG. 10, and for example, when the determination result is negative in S107, the execution may be started in parallel with S100.

The control unit 10000 initially transmits configuration information including information indicating that the function configuration information does not match to the server 2 (S201). The server 2 transmits one of the following three responses based on the configuration information received from the gateway 10. A first response is an instruction to update the function configuration information 61, a second response is an instruction to update the software of the ECU, and a third response is an instruction to update the function configuration information 61 and the software of the ECU. For example, the server 2 selects one of the first to third responses based on an update date and time of the function configuration information 61, an update date and time of the software of the ECU, and the version number of the software. However, the server 2 may return a response not including the update instruction.

When the response is received from the server 2 (S202), the control unit 10000 determines whether or not the update instruction is included in the response. When it is determined that the update instruction is not included (S203: NO), the control unit 10000 instructs the HMI 12 to display the screen G1*c* illustrated in FIG. 9(*c*) (S204), and ends the processing illustrated in FIG. 11. When it is determined that the update instruction is included in the response, the control unit 10000 determines whether or not the instruction to update the function configuration information 61 is included in the response from the server 2. When it determined that the instruction to update the function configuration information 61 is included (S205: YES), the control unit 10000 updates the function configuration information 61 (S206).

Subsequently, the control unit 10000 determines whether or not the instruction to update the software of the ECU is included in the response from the server 2. When it is determined that the instruction to update the software of the ECU is not included (S207: NO), the control unit 10000 instructs the ECU that has stopped the function to recover the function (S209), instructs the HMI 12 to display the screen G1*d* illustrated in FIG. 9(*d*) (S210), and ends the processing illustrated in FIG. 11. When it is determined that the instruction to update the software of the ECU is included (S207: YES), the control unit 10000 executes software update processing of the ECU (S208). When the software update is completed, the control unit 10000 instructs the ECU that has stopped the function to recover the function (S209), instructs the HMI 12 to display the screen G1*d* illustrated in FIG. 9(*d*) (S210), and ends the processing illustrated in FIG. 11.

(Software Update Sequence)

Figure 12:
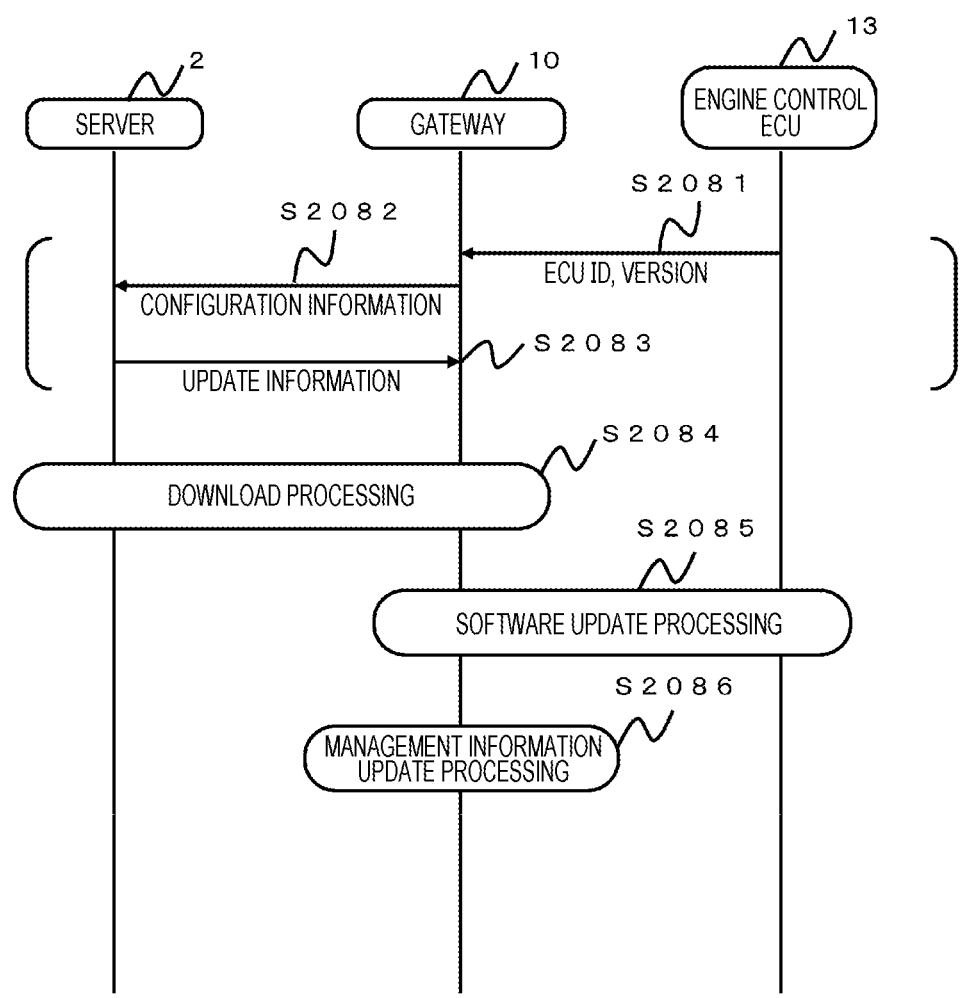
FIG. 12 is a sequence diagram illustrating a procedure of software update of the ECU.

FIG. 12 is a sequence diagram illustrating a procedure of the software update of the ECU. In FIG. 12, although the engine control ECU 13 is described as a processing target of the software update as an example of the processing, a sequence to be described below is common regardless of the processing target ECU.

The gateway 10 initially reads out the ECU ID and the software version from the engine control ECU 13 to be updated (S2081). Subsequently, the gateway 10 transmits the collected ECU ID and software version, that is, the configuration information to the server (S2082). The server 2 determines whether or not the software of the vehicle is updated based on the received configuration information, and transmits update information as a result to the gateway 10 (S2083). Subsequently, the gateway 10 downloads data necessary for updating from the server 2 (S2084). The data necessary for updating includes new software and the function configuration information 61 after the update.

Subsequently, the gateway 10 updates the software of the engine control ECU 13 by controlling the engine control ECU 13 to be updated (S2085). When the update is completed, the gateway 10 updates the function configuration information 61 (S2086).

In the software update processing in S208 of FIG. 11, S2081 to S2083 have already been performed in S201 of FIG. 11, and thus, the description thereof can be omitted. When the function configuration information 61 is not included in the downloaded data, the gateway 10 may not perform S2086.

(Server-Side Screen Display Example)

Figure 13:
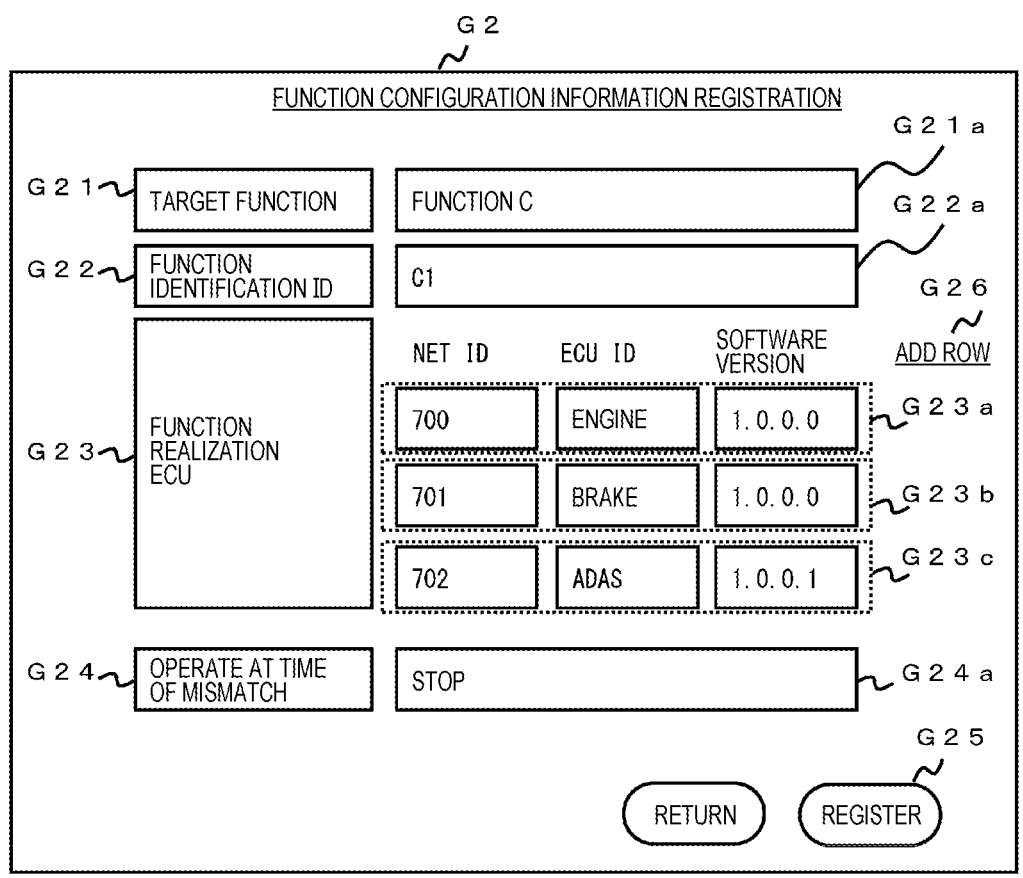
FIG. 13 is a diagram illustrating an example of a registration screen of the function configuration information 61 in the server 2.

FIG. 13 is a diagram illustrating an example of a registration screen of the function configuration information 61 in the server 2. A registration screen G2 is displayed on the display unit 206 of the server 2. The registration screen G2 of the function configuration information 61 includes a target function G21, a function identification ID G22, a function realization ECU G23, an operation G24 at the time of mismatch, a registration button G25, and a row addition button G26.

The target function G21 is a region in which information for identifying a function to be managed such as an emergency braking function is set, and in this example, the "function C" is set as indicated by a reference sign G21a. The function identification ID G22 is a region in which identification information for uniquely identifying a configuration to be managed, and in this example, "C1" is set as indicated by a reference sign G22a.

The relevant ECU G23 is a region in which information for uniquely specifying the ECU that realizes the target function G21 is set, and includes the NET ID, the ECU ID, and the software version. This example illustrates that the function C is realized by three ECUs denoted by reference signs G23a to G23c. The ECU denoted by the reference sign G23a has a NET ID of "700", an ECU ID of "engine", and a software version of "1.0.0.0". The ECU denoted by the reference sign G23b has a NET ID of "701", an ECU ID of "brake", and a software version of "1.0.0.0". The ECU denoted by the reference sign G23c has a NET ID of "702", an ECU ID of "ADAS", and a software version of "1.0.0.0".

The operation G24 at the time of mismatch is a region in which the operation of the function when the mismatch is detected in the configuration information of the function indicated by the target function G21 is set, and in this example, "stop" is set as indicated by a reference sign G24a. The registration button G25 is a button for registering the input information in the server 2, and when the operator presses this button, the values of the fields of the function identification verification information 602 and the table verification information 604 are calculated by the CPU 201. The row addition button G26 is a button for increasing an input field of the function realization ECU.

According to the aforementioned first embodiment, the following advantageous effects are obtained.

(1) The gateway 10 is connected to the plurality of ECUs. Each of the plurality of ECUs has a function configured by one or more ECUs. The gateway 10 includes the external communication unit, that is, the communication control unit 10006 that receives, for each function, the function configuration information 61 including the first identification information of one or more ECUs constituting the function, that is, the NET ID 6031 and the first verification information, that is, the table verification information 604, the acquisition unit 10004 that acquires the software version 6033 installed on the ECU and the second identification information of the ECU, that is, the ECU ID 6032 from each of the plurality of ECUs, the calculation determination unit 10002 that calculates, for each function, the second verification information, that is, the bit string Z by using the software version 6033 that is the version information of all the ECUs constituting the function and is acquired by the acquisition unit and the second identification information of all the ECUs constituting the function, that is, the ECU ID 6032, and the calculation determination unit 10002 that determines whether or not the first verification information and the second verification information match. Thus, the gateway 10 can confirm the configuration information for each function for all the functions constituted by the ECUs connected to the gateway 10.

When a certain function is constituted by the plurality of ECUs, the versions of the pieces of software installed on the plurality of ECUs are desirably a combination as intended. For example, the operation may not be guaranteed by a combination that has not been verified in advance. Since the update of the software can be executed via wireless communication, there is a higher possibility that the combination of the versions of the pieces of software is not scheduled as compared with a case where the software is updated by bringing the software to a specialty store. When the ECU fails, the ECU may be replaced with another ECU having the same model number, and the version of the software of the ECU may not match that of the ECU before replacement. In such a case, the verification processing described in the present embodiment is performed, and thus, it is possible to confirm the configuration information for each function, and it is possible to confirm that there is no problem.

(2) The first identification information is the identifier of the ECU on the network, that is, the NET ID 6031. The second identification information is the identifier indicating the type of the ECU, that is, the ECU ID 6032.

(3) The function configuration information 61 includes the flag 605 indicating whether the execution at the time of mismatch is permitted or rejected for each function. When the calculation determination unit 10002 determines that the first verification information and the second verification information do not match, the stop control unit 10005 stops the function related to the second verification information determined to mismatch, and the function has the flag indicating that the execution at the time of mismatch is rejected as the flag in the function configuration information. Thus, the gateway 10 can stop the function at the time of mismatch in accordance with the setting of the flag 605.

(4) When the calculation determination unit 10002 determines that the first verification information and the second verification information do not match, the control unit 10000 updates at least one of the function configuration information 61 and the software of the ECU based on a command received from the Ether communication controller 1015. Thus, the gateway 10 can update at least one of the function configuration information 61 and the software of the ECU at the time of mismatch.

(5) When the calculation determination unit 10002 determines that the first verification information and the second verification information do not match, the control unit 10000 records the occurrence of the mismatch as a failure code in the FROM 102 that is the storage unit. Thus, the occurrence of the mismatch can be confirmed afterwards by referring to the FROM 102.

(6) When the calculation determination unit 10002 determines that the first verification information and the second verification information do not match, the control unit 10000 displays, on the display unit, that is, the HMI 12, the occurrence of the mismatch. Thus, the occupant of the vehicle 1 can know the occurrence of the mismatch by the display of the HMI 12.

(7) The gateway 10 is mounted on the vehicle 1. When the ignition switch of the vehicle 1 is turned on, the acquisition unit 10004 and the calculation determination unit 10002 start the operations. Thus, these units operate when the vehicle 1 is started, and it is possible to detect the mismatch of the software before the vehicle 1 starts traveling or while the vehicle 1 is traveling at a low speed.

Modification Example 1

The confirmation of the configuration information of each function may be realized by a device other than the gateway 10. For example, the operation may be executed by a diagnosis device connectable to the vehicle 1.

Figure 14:
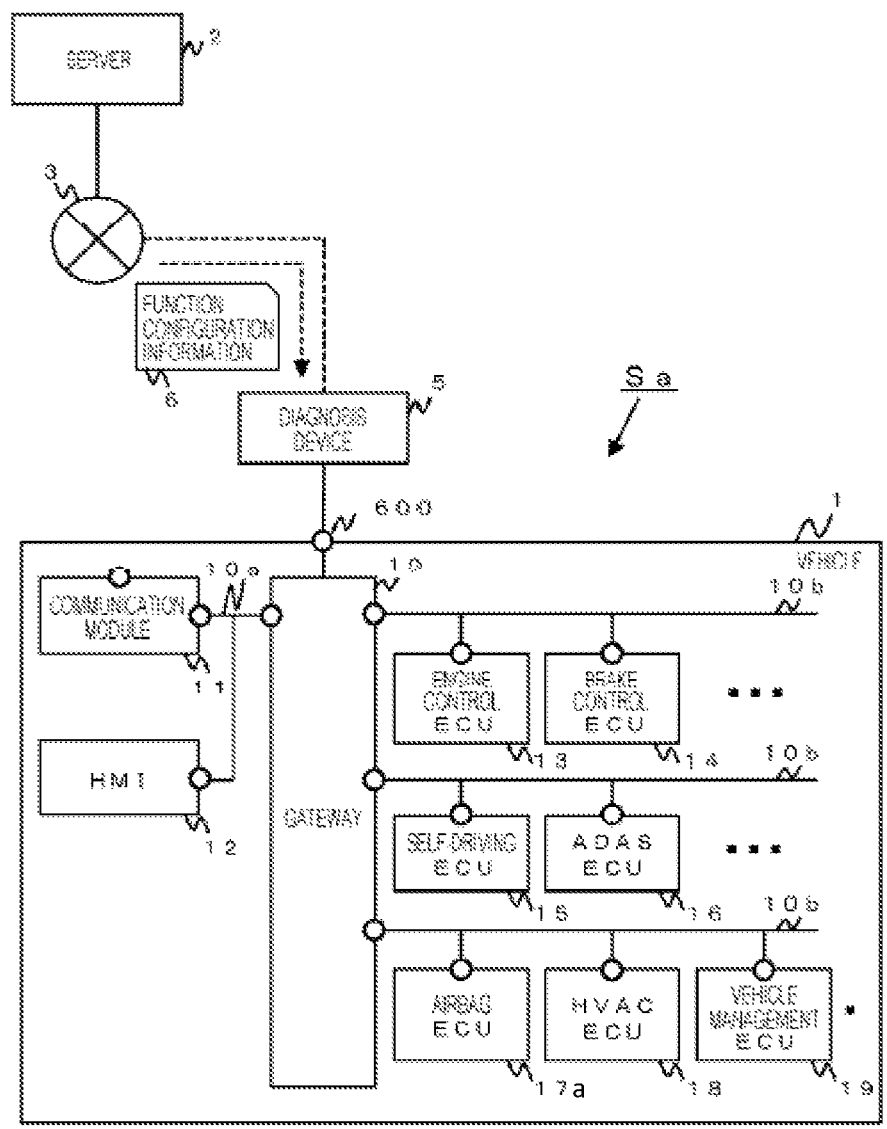
FIG. 14 is a diagram illustrating a configuration of a function configuration information management system Sa according to Modification Example 1.

FIG. 14 is a diagram illustrating a configuration of a function configuration information management system Sa according to Modification Example 1. FIG. 14 is different from the first embodiment in that the diagnosis device 5 is added. FIG. 14 includes airbag ECU 17a, HVAC ECU 18, and vehicle management ECU 19. In the present modification example, the diagnosis device 5 receives the function configuration information 61 transmitted by the server 2. The diagnosis device 5 and the gateway 10 are connected via a general-purpose connector 600 such as OBD 2. Although the communication module 11 and the server 2 are not connected in FIG. 14, when the software of the ECU is updated, the communication module 11 communicates with the server 2 as in the first embodiment.

(Configuration of Diagnosis Device)

Figure 15:
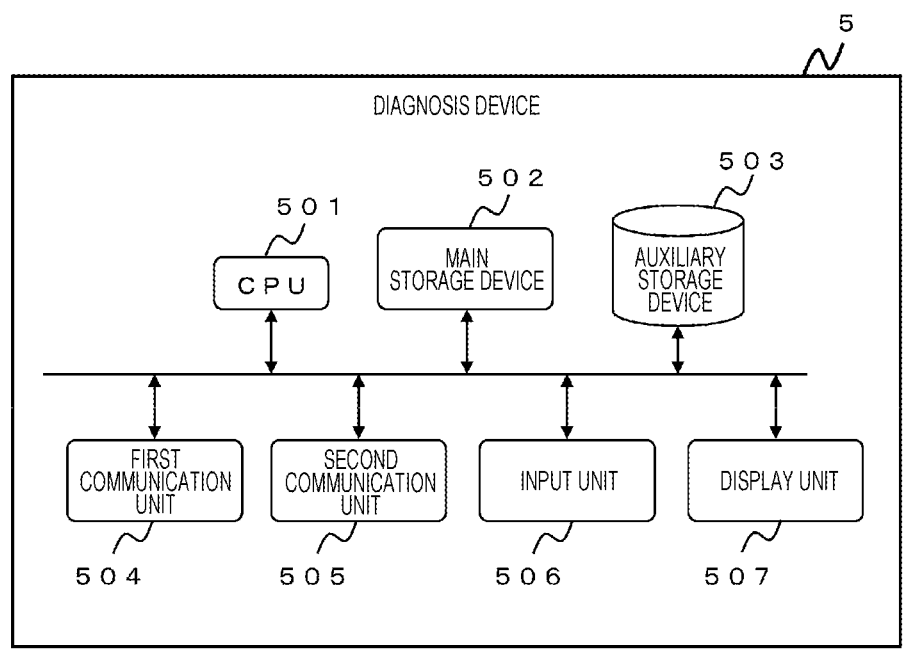
FIG. 15 is a block diagram illustrating a configuration example of a diagnosis device 5 according to Modification Example 1.

FIG. 15 is a block diagram illustrating a configuration example of the diagnosis device 5. The diagnosis device 5 includes a CPU 501, a main storage unit 502, an auxiliary storage unit 503, a first communication unit 504, a second communication unit 505, an input unit 506, and a display unit 507. The CPU 501 controls function configuration management by executing a program accumulated in the auxiliary storage unit 503 or the like on the main storage unit 502. The auxiliary storage unit 503 stores function configuration management information and ECU software update data to be delivered to the vehicle.

The first communication unit 504 transmits and receives data to and from the server 2 via the Internet 3. The second communication unit 505 transmits and receives data to and from the vehicle 1. The input unit 506 receives operation and input information from an operator who operates the diagnosis device 5. The display unit 507 displays the function configuration management information to an operator who operates the diagnosis device 5.

(Operation)

In the present modification example, the verification processing illustrated in FIG. 10 is started when the operator gives an operation instruction from the input unit 506. In the present modification example, the gateway 10 mediates communication with each ECU based on an operation command of the diagnosis device 5. Other operations are similar to those of the first embodiment.

Modification Example 2

In the aforementioned first embodiment, the function configuration information 61 also includes the ECU ID 6032 and the software version 6033. However, since the gateway 10 does not particularly require the ECU ID 6032 and the software version 6033 including the verification processing, the function configuration information 61 may not include the ECU ID 6032 and the software version 6033.

FIG. 16 is a diagram illustrating an example of function configuration information 64 according to Modification Example 1. In the function configuration information 64, the combination table 603 includes only the NET ID 6031. In the present modification example, the operation of the gateway 10 is similar to that of the first embodiment. As described above, in the first embodiment, the gateway 10 has not had a chance to refer to an ECU ID 6034 and a function version 6035 described in the function configuration information 61 received from the server 2. Thus, even though the ECU ID 6034 and the function version 6035 are deleted from function configuration information 64, there is no influence.

Modification Example 3

In the aforementioned first embodiment, the function configuration information 61 also includes the NET ID 6031 and the software version 6033. However, the function configuration information 61 may not include the NET ID 6031 and the software version 6033.

FIG. 17 is a diagram illustrating an example of function configuration information 65 according to Modification Example 3. In the function configuration information 65, the combination table 603 includes only the ECU ID 6032. In the present modification example, S103 to S105 in FIG. 10 of the gateway 10 are changed as follows. That is, the gateway 10 transmits a message inquiring the ECU ID and the version of the software to all the connected ECUs. For each function described in the function configuration information 65, verification information, that is, the bit string Z in FIG. 8 is created by using the acquired ECU ID and software version.

In the first embodiment, the gateway 10 uses the NET ID 6031 to specify the ECU constituting the function for each function and make an inquiry. However, in the present modification example, since the NET ID 6031 is not included in the function configuration information 65, an inquiry is made to all the connected ECUs. In the present modification example, since the ECU constituting each function in the function configuration information 65 is specified by the ECU ID 6032, the gateway 10 can create the bit string Z for each function by using the ECU ID and the version information obtained as a response to the inquiry.

Modification Example 4

In the aforementioned first embodiment, the flag 605 is included in the function configuration information 61. However, the flag 605 may not be included in the function configuration information 61. In this case, the gateway 10 is configured to uniformly permit the operation or not to uniformly permit the operation in S110 of FIG. 10. In this case, the function may be restricted instead of stopping the operation. The restriction of the function is to reduce processing capacity or to reduce the type of the function to be realized.

According to the present modification example, the following advantageous effects are obtained.

(8) When the calculation determination unit 10002 determines that the first verification information and the second verification information do not match, the stop control unit 10005 stops or restricts the function related to the second verification information determined to mismatch. Thus, it is possible to uniformly stop the function in which the mismatch of the software is detected or restrict the function.

Modification Example 5

In the aforementioned first embodiment, the information is verified between the server 2 and the gateway 10 by using public key cryptosystem. However, the verification method is not particularly limited, and replacement with various known methods and combination of known methods are also included in the scope of the invention. For example, even in the same public key cryptosystem, the verification may be performed by encrypting with the secret key SK in the server 2 and decrypting with the public key PK in the gateway 10. A symmetric encryption scheme may be used instead of the public key cryptosystem, or a message authentication code or SALT may be used.

Modification Example 6

A recovery possibility flag may be included in the response from the server 2 to the gateway 10. In this case, in step S209 of FIG. 11, the control unit 10000 of the gateway 10 instructs only the ECU to which a flag indicating that the recovery may be performed is set by the recovery possibility flag to recover the function.

Modification Example 7

Although not specifically described in the first embodiment, the gateway 10 may verify the function identification verification information 602 similarly to the table verification information 604. In this case, for example, the gateway 10 verifies the function identification verification information 602 immediately before S108 in FIG. 10, and the processing proceeds to S112 when the verification has succeeded, and proceeds to S108 when the verification has failed. According to the present modification example, the function identification ID 601 can be verified.

Modification Example 8

The server 2 may further use at least one of the function identification ID 601 and the NET ID 6031 to calculate the table verification information 604. In this case, the gateway 10 also performs similar calculation in the verification processing.

Modification Example 9

In the aforementioned first embodiment, the gateway 10 starts the verification processing when the ignition switch of the vehicle 1 is turned on. However, the gateway 10 may receive an operation command from the outside, and may start the verification processing. For example, the gateway 10 may receive the operation command from the outside of the vehicle 1 via the communication module 11, or may receive the operation command from the ECU or the like mounted on the vehicle 1 and may start the operation.

Modification Example 10

In the aforementioned first embodiment, the function configuration information 61 is created by the server 2 based on the information input by the operator. However, the operator may create the function configuration information in advance, and the operator may store the function configuration information 61 itself in the auxiliary storage unit 203 of the server 2.

Second Embodiment

A second embodiment of the gateway which is the arithmetic operation device according to the invention will be described with reference to FIGS. 18 to 19. In the following description, the same components as those in the first embodiment are assigned by the same reference signs, and differences will be mainly described. Points not particularly described are the same as those in the first embodiment. The present embodiment is different from the first embodiment mainly in that the version of the software is managed in the ECU for each function. The present embodiment is different from the first embodiment in the information stored in the function configuration information.

FIG. 18 is a diagram illustrating an example of function-specific version information 951 stored in each ECU according to the second embodiment. In FIG. 18, the engine control ECU 13 is used as a specific example, FIG. 18(a) illustrates function-specific version information 951a before update of the engine control ECU 13, and FIG. 18(b) illustrates function-specific version information 951b after update of the engine control ECU 13. The engine control ECU 13 contributes to the realization of the function A and the function C. Thus, as illustrated in FIG. 18(a), the function-specific version information 951 stored in the engine control ECU 13 includes "1.0.0.0" that is a software version, "1" that is a function A version, and "1" that is a function C version. The function-specific version information 950 is updated as the software is updated.

In the function-specific version information 951b after update illustrated in FIG. 18(b), the software version is updated to "1.0.1.0", and the function A version is updated to "2". However, since the update related to the function C has not been performed, the function C version is not changed from "1".

FIG. 19 is a diagram illustrating an example of function configuration information 62 according to the present embodiment. FIG. 19(a) is a diagram illustrating function configuration information 62a before update, and FIG. 19(b) is a diagram illustrating function configuration information 62b after update. The example illustrated in FIG. 19(a) includes records of R41, R51, and R61, and the example illustrated in FIG. 19(b) includes records of R42, R52, and R62. When the function configuration information 62 according to the present embodiment is compared with the function configuration information 61 according to the first embodiment, the field of the software version 6033 in the function configuration information 61 is deleted, and instead, the fields of a DID 6034 and the function version 6035 are added.

The DID 6034 stores identification information used when a version for each function is read from the ECU. The DID 6034 is identification information of a function set for reading out version information. As illustrated in FIG. 19, the DID 6034 may correspond to the function by 1:1 in common to all the ECUs, or a correspondence between the DID and the function may be different for each ECU. For example, FIG. 19 indicates that version information of the function C is read out by "F003" which is the DID 6034 common to three ECUs in the record R61.

When FIG. 19(*a*) is compared with FIG. 19(*b*), a record R41 and a record R42 are different, but a record R51 and a record R61 are the same as a record R52 and a record R62. This is because the version information itself of the software is not stored in the function configuration information 62, and only the version information of each function of each software is stored in the function configuration information 62.

(Other Differences)

In the present embodiment, when each ECU receives an inquiry about the version information of the software together with the DID 6034 from the gateway 10, each ECU performs the following operation. That is, the ECU returns the version information of the function corresponding to the received DID 6034 while referring to the function configuration information 62 stored in the FROM 1313.

In S104 of FIG. 10, the gateway 10 inquires of the ECU having the NET ID stored in the function configuration information 62 about the version information together with the DID 6034. For example, when the processing target record X=1, the gateway 10 inquires of the ECU having the NET ID "700" about the version information together with the DID 6034 of "F001".

In the present embodiment, the server 2 creates the bit string X by using the ECU ID 6032 and the function version 6035, and creates the table verification information 604 which is the digital signature thereof. The gateway 10 creates the bit string Z by using the ECU ID 6032 and the function version 6035, and verifies the table verification information 604.

As described above, the version information of the relevant software portion is managed in the ECU for each function, and thus, it is possible to reduce a change portion of the function configuration information 62 by reducing the influence on the function configuration information at the time of software update.

Modified Example of Second Embodiment

The server 2 may further use a value of the DID 6034 in the creation of the bit string X. In this case, the gateway 10 also uses the value of the DID 6034 in the creation of the bit string Z.

Third Embodiment

A third embodiment of the gateway which is the arithmetic operation device according to the invention will be described with reference to FIGS. 20 to 21. In the following description, the same components as those in the second embodiment are assigned the same reference signs, and differences will be mainly described. Points not particularly described are the same as those in the second embodiment. The present embodiment is different from the second embodiment mainly in the information stored in the function configuration information.

FIG. 20 is a diagram illustrating an example of function-specific version information 952 stored in each ECU in the present embodiment. In FIG. 20, the engine control ECU 13 is used as a specific example, FIG. 20(*a*) illustrates function-specific version information 952*a* before update of the engine control ECU 13, and FIG. 20(*b*) illustrates function-specific version information 952*b* after update of the engine control ECU 13.

The function-specific version information 952 includes 6 bytes, and indicates information for uniquely identifying the software version such as a boot loader, BSW, ASW, calibration data, function A, and function C from the head. Values of digits of the function-specific version information 952 are updated as software of a target portion is updated. In FIG. 20, the pieces of information corresponding to the digits are described for the sake of convenience in description, but actually, the function-specific version information 952 includes only values of 6 bytes.

The function-specific version information 952*a* before update illustrated in FIG. 20(*a*) is "1, 1, 1, 1, 1, 1, 1". In the function-specific version information 952*b* after update illustrated in FIG. 20(*b*), since the portion related to the function A is updated, the identification information corresponding to the function A is updated to "2", and the identification information of the ASW indicating the software of the entire application including the function A is updated to "2".

FIG. 21 is a diagram illustrating an example of function configuration information 63 according to the present embodiment. FIG. 21(*a*) is a diagram illustrating function configuration information 63*a* before update, and FIG. 21(*b*) is a diagram illustrating function configuration information 63*b* after update. The example illustrated in FIG. 21(*a*) includes records of R71, R81, and R91, and the example illustrated in FIG. 21(*b*) includes records of R72, R82, and R92. When the function configuration information 63 according to the present embodiment is compared with the function configuration information 62 according to the second embodiment, a field of a mask 6036 is added instead of the DID 6034 in the function configuration information 62.

The mask 6036 is identification information indicating which byte corresponds to the identification information of the function from the head of the function-specific version information 952. After the function-specific version information 952 is read out from the ECU, the gateway 10 specifies the identification information regarding the function from the readout function-specific version information 952 by using the mask 6036. However, the gateway 10 may transmit a value of the mask 6036 together with a request of the function-specific version information 952 of the software to the ECU, and the ECU may return only a value of a bit corresponding to the mask 6036 in the function-specific version information 952.

When FIG. 21(*a*) is compared with FIG. 21(*b*), the record R1 and the record R72 are different, but the record R81 and the record R91 are the same as the record R82 and the record R92. This is because the version information itself of the software is not stored in the function configuration information 63, and only the version information of each function of each software is stored in the function configuration information 63.

Since the other points are similar to those of the second embodiment, the description thereof will be omitted.

As described above, the version of the relevant software portion is managed in the ECU for each function, and thus, it is possible to reduce an unnecessary change by reducing the influence on the function configuration information at the time of software update.

Fourth Embodiment

A third embodiment of the gateway which is the arithmetic operation device according to the invention will be described with reference to FIGS. 22 to 24. In the following description, the same components as those in the second embodiment are assigned the same reference signs, and differences will be mainly described. Points not particularly described are the same as those in the second embodiment. The present embodiment is different from the first embodiment mainly in a behavior when the table verification information does not match.

FIG. 22 is a diagram illustrating function configuration information 61c of the function D, and FIG. 23 is a diagram illustrating function restriction information 91 of the function D.

A record R4 in FIG. 22 is a record in which information related to the function D of which the function identification ID is indicated by "D2" is stored. "dzzz" is stored in the field of the function identification verification information 602 of the record R4. Since there are three ECUs constituting the function D, "701", "702", and "703" are respectively stored in the fields of the NET ID 6031, "brake", "ADAS", and "camera" are respectively stored in the fields of the ECU ID 6032, and "1.0.0.0", "1.0.0.1", and "1.0.0.0" are respectively stored in the fields of the software version 6033. "tddd" is stored in the field of the table verification information 604 of the record R4, and "restriction" indicating that operation restriction of the function is necessary when the mismatch occurs is stored in the field of the flag 605. Here, the operation restriction of the function means not stopping the function but continuously operating a part of the function. That is, in the present embodiment, either "stop" or "restriction" is stored in the field of the flag 605, and a value of "operation permission" is not stored.

FIG. 23 is a diagram illustrating an example of the function restriction information 91 to be referred to when the field of the flag 605 is "restriction", and is managed similarly to the function configuration information 61c. A record R41 in FIG. 23 is a record in which the function restriction information related to the function D is stored. Since "D" is stored in a field of a function 600 of the record R41 and the number of ECUs constituting the function D is 3, "brake", "ADAS", and "camera" are stored in the fields of the version mismatch ECU ID 6038, respectively, and "only warning operated", "all functions stopped", and "all functions stopped" are stored in the fields of a restriction content 6037.

An example of a case where the function D is an automatic brake function will be described below for the contents exemplified in FIG. 23. The automatic braking function of the function D is realized by cooperation of three ECUs having IDs of "brake", "ADAS", and "camera". The automatic braking function includes three basic functions including detection of an obstacle for which the brake is put on, warning to a driver when the obstacle approaches, and braking. In this function configuration, when the version of the "brake" ECU does not match, since the camera and the ADAS ECU can operate normally, the detection of the obstacle and the warning to the driver among the basic functions can be realized without any problem, and these functions are preferably operated. On the other hand, when the versions of the "camera" and "ADAS" ECUs do not match, since there may be a problem in the detection of the obstacle and the warning, it is preferable to fully stop the automatic brake function. As described above, even when the table verification information 604 does not match, it is possible to operate a useful function.

Figure 24:
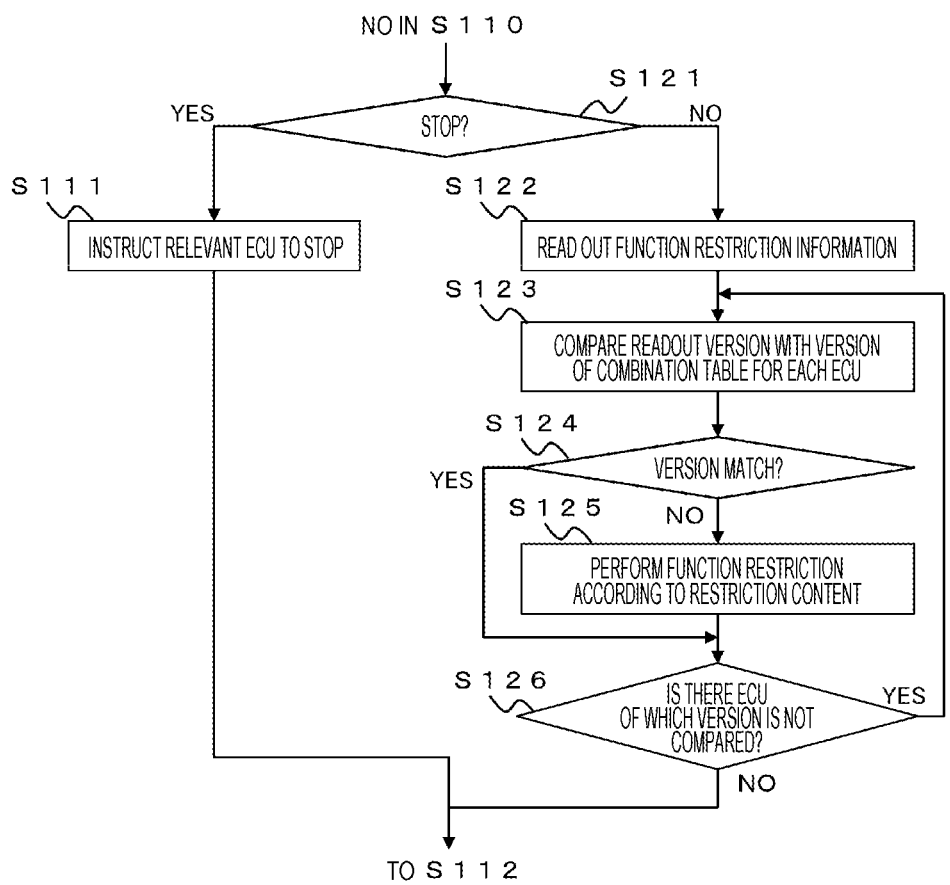
FIG. 24 is a flowchart illustrating function restriction processing in the gateway 10 according to the fourth embodiment.

FIG. 24 is a flowchart illustrating function restriction processing in the gateway 10. This processing is realized by replacing processing S111 in FIG. 10. First, the stop control unit 10005 determines whether or not the flag is "stop", and when the flag is "stop" (YES in S121), the stop control unit instructs the relevant ECU to stop (S111). When the flag is not "stop", that is, when the flag is "function restriction" (NO in S121), the record R41 of the function D of the function restriction information 91 is read out (S122).

Subsequently, the gateway 10 compares the version acquired from the ECU with the version of the function configuration information 61c for each ECU, and confirms a difference (S123). When it is determined that the versions match, the gateway 10 does not perform the function restriction (YES in S124). When it is determined that the versions do not match (NO in S124), the gateway 10 restricts a part of the function according to the content defined in the restriction content 6037 of the function restriction information 91 (S125). Subsequently, it is determined whether or not there is the ECU for which the version of the gateway 10 is not compared (S126), and when the comparison for all the versions is completed, the processing is ended (NO in S126). When it is determined that there is the ECU for which the version is not compared (NO in S126), the gateway 10 returns to S123 and repeats the processing.

In the above-described fourth embodiment, the following advantageous effects are obtained.

(9) When the calculation determination unit 10002 determines that the first verification information and the second verification information do not match, the stop control unit 10005 decides whether or not to restrict the function based on the second identification information of which the version information does not match for the function related to the second verification information determined to mismatch while referring to the function restriction information 91, and the function has the flag indicating that the execution at the time of mismatch is permitted. Thus, even when the table verification information does not match, it is possible to operate a useful function.

The invention is not limited to the aforementioned embodiments, and includes various modification examples. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. The components of another embodiment can be added, removed, and substituted to, from, and into some of the components of the aforementioned embodiments, and the processing order in the tasks of processing can be replaced. For example, although the function configuration information management device is the gateway 10 in the first embodiment, the communication module 11 or the HMI 12 may be the function configuration information management device. A dedicated device may be provided.

In the above-described embodiments and modification examples, the configuration of the functional block is merely an example. Some function configurations illustrated as separate functional blocks may be integrally constructed, or a configuration illustrated in one functional block diagram may be divided into two or more functions. Some of the functions of each functional block may be included in another functional block.

In addition, a part or all of the aforementioned configurations, functions, processing units, and processing means may be realized by hardware by designing an integrated circuit, for example. Each of the aforementioned configurations and functions may be realized by software by interpreting and executing software that realizes each function by the processor.

Furthermore, control lines and information lines illustrate lines which are considered to be necessary for the description, and not all the control lines and information lines in a product are necessarily illustrated. Almost all the configurations may be considered to be actually connected to each other.

Although various embodiments and modification examples have been described above, the present invention is not limited to these contents. Other aspects considered within the scope of the technical idea of the present invention are also included within the scope of the present invention.

The disclosure content of the next priority basic application is incorporated here by reference.

Japanese Patent Application No. 2019-66887 (filed on Mar. 29, 2019)

REFERENCE SIGNS LIST 1 vehicle
5 diagnosis device
6 function configuration information
10 gateway
61, 62, 63, 64, 65 function configuration information
604 table verification information
605 flag
6031 NET ID
6032 ECU ID
10002 calculation determination unit
10005 stop control unit

The invention claimed is:

1. An arithmetic operation device which is connected to a plurality of electronic control units, wherein
   one or more electronic control units of the plurality of electronic control units constitute each of functions, and
   the arithmetic operation device including:
      an external communication unit configured to receive, for each function, function configuration information including first verification information and first identification information of the one or more electronic control units constituting the function;
      an acquisition unit configured to acquire version information of software installed on the electronic control unit and second identification information of the electronic control unit from each of the plurality of electronic control units;
      a calculation unit configured to calculate, for each function, second verification information by using the version information acquired by the acquisition unit, which is the version information of all the electronic control units constituting the function, and the second identification information of all the electronic control units constituting the function; and
      a determination unit configured to determine, for each function, whether or not the first verification information and the second verification information match, wherein
   the function configuration information includes a flag indicating that the execution in the case of mismatch is permitted or rejected for each function, and
   the arithmetic operation device further includes a stop control unit which stops the function related to the second verification information determined to mismatch when the determination unit determines that the first verification information and the second verification information do not match, the function having a flag indicting that the execution in the case of mismatch is rejected as the flag in the function configuration information,
   wherein, when the determination unit determinnes that the first verification information and the second verification information do not match, the stop control unit decides whether or not to restrict the function based on the second identification information indicating which version information does not match for the function related to the second verificatioin information determined to mismatch while referring to function restriction information, the function having a flag indicating that the execution at the time of mismatch is permitted or not.

2. The arithmetic operation device according to claim 1, wherein
   the first identification information is an identifier of the electronic control unit on a network, and
   the second identification information is an identifier indicating a type of the electronic control unit.

3. The arithmetic operation device according to claim 1, wherein the first identification information and the second identification information are identifiers indicating the types of the electronic control units.

4. The arithmetic operation device according to claim 1, further comprising
   an update control unit configured to update the function configuration information based on a command received from the external communication unit when the determination unit determines that the first verification information and the second verification information do not match.

5. The arithmetic operation device according to claim 1, further comprising
   a control unit configured to record occurrence of mismatch in a storage unit when the determination unit determines that the first verification information and the second verification information do not match.

6. The arithmetic operation device according to claim 1, further comprising
   a control unit configured to display occurrence of mismatch on a display unit when the determination unit determines that the first verification information and the second verification information do not match.

7. The arithmetic operation device according to claim 1, wherein
   the arithmetic operation device is mounted on a vehicle, and
   the acquisition unit, the calculation unit, and the determination unit start operations when an ignition switch of the vehicle is turned on.

8. The arithmetic operation device according to claim 1, wherein the acquisition unit, the calculation unit, and the determination unit start operations when an operation command is received from outside of the vehicle.

9. A determination method executed by an arithmetic operation device connected to a plurality of electronic control units, wherein
   one or more electronic control units of the plurality of electronic control units constitute each function, and the determination method includes:
- receiving, for each function, first verification information and first identification information of the one or more electronic control units constituting the function;
- acquiring version information of software installed on the electronic control unit and second identification information of the electronic control unit from each of the plurality of electronic control units;
- creating, for each function, second verification information by using the acquired version information which is the version information of all the electronic control units constituting the function and the second identification information of all the electronic control units constituting the function; and
- determining, for each function, whether or not the first verification information and the second verification information match, wherein the function configuration information includes a flag indicating that the execution in the case of mismatch is permitted or rejected for each function; and stopping the function related to the second verification information determined to mismatch when the first verification information and the second verification information are determined not to match, the function having a flag indicating that the execution in the case of mismatch is rejected as the flag in the function configuration information, wherein, when the first verification information and the second verification information are determined not to match, deciding whether or not to restrict the function based on the second identification information indicating which version information does not match for the function related to the second verification information determined to mismatch while referring to function restriction information, the function having a flag indicating whether the execution at the time of mismatch is permitted or not.

* * * * *